United States Patent
Lazarev

(10) Patent No.: US 7,450,194 B2
(45) Date of Patent: Nov. 11, 2008

(54) POLARIZED INTERFERENCE RECYCLING BACKLIGHT MODULE AND LIQUID CRYSTAL DISPLAY INCORPORATING THE SAME

(75) Inventor: Pavel I. Lazarev, Belmont, CA (US)

(73) Assignee: Nitto Denko Corporation, Osaka (JP)

(*) Notice: Subject to any disclaimer, the term of this patent is extended or adjusted under 35 U.S.C. 154(b) by 426 days.

(21) Appl. No.: 10/957,055

(22) Filed: Oct. 1, 2004

(65) Prior Publication Data

US 2005/0195340 A1    Sep. 8, 2005

Related U.S. Application Data

(66) Substitute for application No. 60/550,644, filed on Mar. 4, 2004.

(51) Int. Cl.
*G02F 1/1335* (2006.01)

(52) U.S. Cl. .......................... 349/96; 349/62; 349/114; 349/115

(58) Field of Classification Search .................... 349/96
See application file for complete search history.

(56) References Cited

U.S. PATENT DOCUMENTS

| | | | |
|---|---|---|---|
| 4,084,883 A | | 4/1978 | Eastman et al. |
| 4,211,473 A | * | 7/1980 | Shanks ........................ 349/164 |
| 4,364,640 A | | 12/1982 | Krüger et al. |
| 5,190,365 A | | 3/1993 | Cordy, Jr. |
| 5,587,816 A | * | 12/1996 | Gunjima et al. ............... 349/62 |
| 5,828,488 A | | 10/1998 | Ouderkirk et al. |
| 5,982,540 A | | 11/1999 | Koike et al. |

(Continued)

FOREIGN PATENT DOCUMENTS

EP    1 004 921 A1    5/2000

(Continued)

OTHER PUBLICATIONS

Ignatov et al., "Thin Crystal Film polarizers and retarders", 2002, Proceedings of SPIE, vol. 4658, pp. 79-90.*

(Continued)

*Primary Examiner*—Andrew Schechter
*Assistant Examiner*—W. Patty Chen
(74) *Attorney, Agent, or Firm*—Westerman, Hattori, Daniels & Adrian, LLP.

(57) ABSTRACT

A polarized interference recycling backlight module for generating light with a single polarization state, which reduces the optical loss in light beam output, is suitable for mass production, and decreases manufacturing costs, is disclosed. The backlight is easily integrated with conventional electro-optical display devices and achieves high-quality polarization. The polarized interference recycling backlight module according to the present invention comprises an optical cavity and interference polar (I-Polar) composed of stacked layers. At least one layer of said I-Polar is optically anisotropic and is made by means of Cascade Crystallization Process, is characterized by a globally ordered biaxial crystalline structure with an intermolecular spacing of 3.4±0.3 Å in the direction of one of optical axes, is transparent in the visible spectral range, and is formed by rodlike supramolecules representing at least one polycyclic organic compound with a conjugated π-system and ionogenic groups. Another aspect of the present invention is a liquid crystal display incorporating the polarized interference recycling backlight module.

51 Claims, 17 Drawing Sheets

U.S. PATENT DOCUMENTS

| | | | |
|---|---|---|---|
| 6,025,897 A | 2/2000 | Weber et al. | |
| 6,160,595 A | 12/2000 | Kishimoto | |
| 6,163,351 A | 12/2000 | Nakayama | |
| 6,172,809 B1 | 1/2001 | Koike et al. | |
| 6,464,367 B2 | 10/2002 | Ito et al. | |
| 6,583,284 B1* | 6/2003 | Sidorenko et al. | 544/342 |
| 6,688,751 B2 | 2/2004 | Lee et al. | |
| 2002/0003593 A1 | 1/2002 | Arakawa et al. | |
| 2002/0003594 A1 | 1/2002 | Ishii et al. | |
| 2002/0036728 A1* | 3/2002 | Okumura | 349/61 |
| 2002/0051103 A1 | 5/2002 | Faris et al. | |
| 2002/0085146 A1* | 7/2002 | Miyazaki | 349/96 |
| 2002/0121848 A1 | 9/2002 | Lee et al. | |
| 2002/0167811 A1* | 11/2002 | Blanchard | 362/318 |
| 2002/0196385 A1 | 12/2002 | He et al. | |
| 2003/0039112 A1 | 2/2003 | Chen et al. | |
| 2003/0081402 A1 | 5/2003 | Jeon et al. | |
| 2003/0117791 A1 | 6/2003 | Kim | |

FOREIGN PATENT DOCUMENTS

| | | |
|---|---|---|
| GB | 2 331 615 A | 5/1999 |
| WO | WO 97/01780 A1 | 1/1997 |
| WO | WO 03/023277 A1 | 3/2003 |

OTHER PUBLICATIONS

Chinese Office Action dated Apr. 4, 2008 issued in corresponding Application No. 200580033547.0.

* cited by examiner

POLARIZED INTERFERENCE RECYCLING BACKLIGHT MODULE AND LIQUID CRYSTAL DISPLAY INCORPORATING THE SAME

CROSS REFERENCE TO RELATED APPLICATIONS

This application claims the priority of the united states provisional patent application Ser. No. 60/550,644, filed Mar. 4, 2004, the disclosure of which is hereby incorporated by reference in its entirety.

FIELD OF THE INVENTION

This invention relates generally to backlight modules for electro-optical display devices, and more particularly, to a backlight module for generating light with a single polarization state.

BACKGROUND OF THE INVENTION

Flat panel displays characterized by small thickness, low weight, and low power consumption find increasing use as displays in portable devices. Among flat panel displays of various types, liquid crystal display (LCD) devices are most widely used in laptop computers and desktop monitors because of their superior resolution, color image, and display quality.

LCD devices use the optical anisotropy and polarization properties of liquid crystal molecules to produce a predetermined image. Liquid crystal molecules have a definite orientation, which depends on their particular characteristics. This orientation can be modified by an electric field applied across the axes of liquid crystal molecules. In other words, electric fields applied across the molecular axis can change the orientation of liquid crystal molecules. Due to optical anisotropy, incident light is refracted according to the orientation of liquid crystal molecules.

LCD devices comprise upper and lower substrates with electrodes, which are spaced apart and face each other, and a layer of liquid-crystalline substance confined between these substrates. When a voltage is applied to the liquid crystal layer with the aid of electrodes placed on each substrate, the direction of alignment of the liquid crystal molecules is changed in accordance with the applied voltage so as to display desired images. By controlling the applied voltage, it is possible to provide variable transmission of light beams in the LCD device to display data images.

LCD devices, however, do not emit light by themselves, and only control the transmission of incident light. Therefore, each LCD device needs an additional light source. In particular, LCD devices often use light sources in the form of backlight modules. The backlight modules are classified into "direct backlight" (or simply "direct") and "edge backlight" (or simply "edge") types, according to the arrangement of a lamp (or lamps). When a backlight module of the direct type is used for a liquid crystal display device, light beams radiated by a lamp are directly incident upon the LCD panel. In the case when the edge type backlight module is used, light beams radiated by a lamp enter the LCD panel via a light guide or a reflector. Light guides are made of optically transparent materials transmitting light along their length by means of total internal reflection. Finally, the light beam is reflected from the back surface of the light guide toward the front surface at an angle, which allows it to exit from the front edge of the light guide. Various reflection mechanisms are used to distribute the light exiting the guide uniformly over the panel, including reflective dots, channels, facets, etc.

Backlight modules employing non-collimated light sources, such as fluorescent lamps, typically incorporate at least two reflectors. A lamp cavity reflector is used to reflect the light emitted in a direction away from the light guide back toward the guide. This reflector can be specular or diffuse, although specular reflectors are most frequently employed.

The second reflector is provided near the back surface of the light guide to reflect light from the back surface of the light guide and direct it toward the front surface of the light guide where it can be transmitted to the viewer (to the LCD device).

The main disadvantage of conventional reflectors used in the lamp cavity and at the back surface of the light guide is the relatively high optical absorption and high transmission of incident light. Typical reflectors absorb or transmit from about 4 to 15% of the incident light. This fraction of light is obviously not available to the viewer; thereby the absorption and/or transmission lead to degradation of the backlight module performance.

With advent of the information technology age, there is increasing demand for high-quality LCDs. High-quality imaging requires more effective utilization of the radiation emitted by light sources. Conventionally, for obtaining singly polarized light beam output from an LCD backlight module, a polarizing plate is arranged between the LCD device and the backlight module in order to inhibit the passage of light beams with undesired polarization. In practice, the intensity of the resultant light beam with a single polarization state is less than half of the original light beam in terms of illuminance.

SUMMARY OF THE INVENTION

The disclosed invention represents a polarized interference recycling backlight module. The backlight module comprises an optical cavity serving as a light source, which is capable of reflecting and randomizing light incident upon a front surface of said optical cavity, and an I-Polar comprised of stacked layers, which is situated on the front surface of the optical cavity, which ensures transmission of light of predetermined polarization state and reflection of light with orthogonal polarization state in at least one region of the spectrum of light.

At least one layer of said I-Polar is optically anisotropic and is made by means of Cascade Crystallization Process. This layer is characterized by a globally ordered biaxial crystalline structure with an intermolecular spacing of 3.4±0.3 Å in the direction of one of the optical axes, is transparent in the visible spectral range, and is formed by rodlike supramolecules representing at least one polycyclic organic compound with a conjugated π-system and ionogenic groups.

Another aspect of the present invention is a liquid crystal display, comprising a liquid crystal cell, and a backlight module. The backlight module comprises an optical cavity serving as a light source, reflecting and randomizing light incident upon a front surface of said optical cavity. The backlight module also comprises I-Polar comprising stacked layers. Said I-Polar is situated between the front surface of the optical cavity and the liquid crystal cell, providing transmission of light with a predetermined polarization state and reflection of light with orthogonal polarization state in at least one region of the spectrum of light. At least one layer of said I-Polar is optically anisotropic and made by means of Cascade Crystallization Process and characterized by a globally ordered biaxial crystalline structure with an intermolecular spacing of 3.4±0.3 Å in the direction of one of optical axes, is transparent in the visible spectral range, and formed by rodlike supramolecules, which comprise at least one polycyclic organic compound with a conjugated π-system and ionogenic groups.

BRIEF DESCRIPTION OF DRAWINGS

A more complete assessment of the present invention and its numerous advantages will be readily achieved as the same becomes better understood by reference to the following detailed description, considered in connection with the accompanying drawings and detailed specification, all of which forms a part of the disclosure.

DETAILED DESCRIPTION OF THE INVENTION

Having generally described the present invention, further understanding can be ensured by reference to the specific preferred embodiments, which are provided herein for purposes of illustration only and are not intended to limit the scope of the appended claims.

Figure 1:
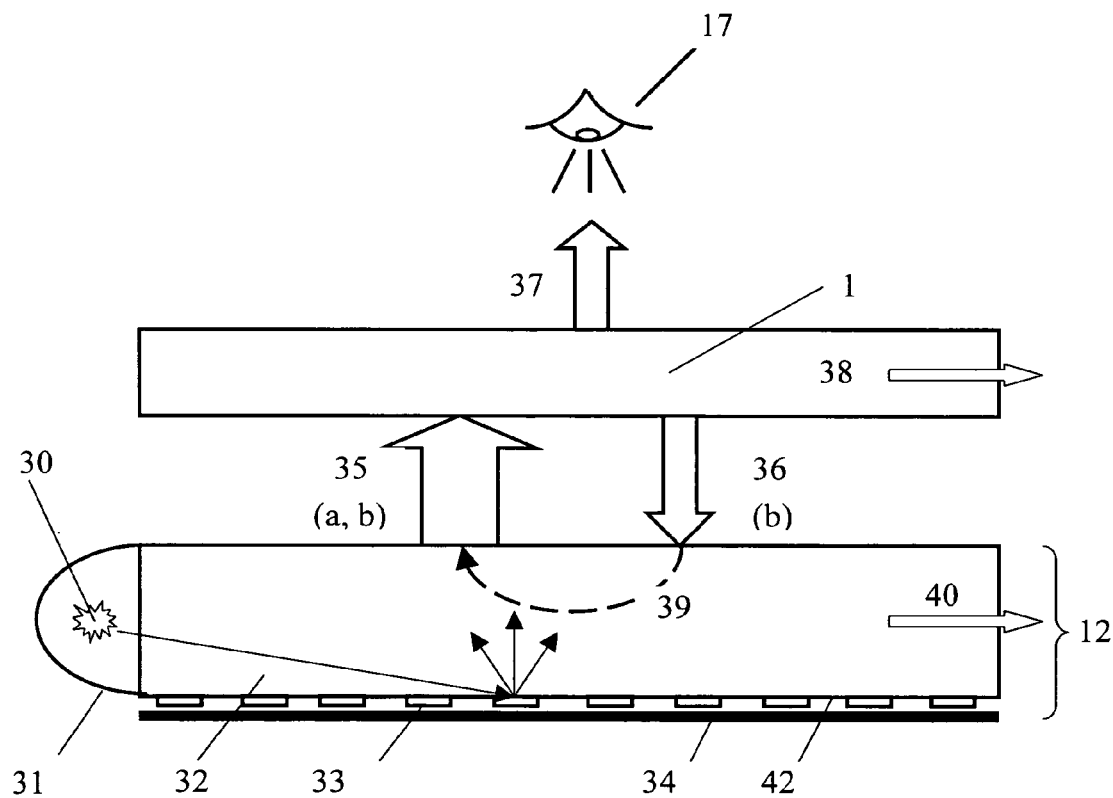
FIG. 1 shows the cross section of a polarized interference recycling backlight module of the edge type comprising I-Polar.

FIG. 1 shows the cross section of a polarized interference recycling backlight module according to one embodiment of the present invention. In this embodiment, the optical cavity (12) of the edge backlight type includes a light source (30) in a lamp cavity reflector (31). Light source (30) can be of any type, for example, a fluorescent lamp, incandescent lamp, solid-state source, electroluminescent (EL) device, etc. Although the embodiments described below typically include one such source, it will be understood that a backlight system according to the present invention could include two or more sources located at the same or different positions and combined so as to provide the required amount of light. In the preferred embodiments, the light source (30) comprises a source emitting light having randomized polarization.

The light from light source (30) is coupled to the light guide (32) where it propagates until it encounters a diffuse-reflecting structure such as spots (33). A discontinuous array of spots is arranged so as to extract the light and direct it toward observer (17). Mechanisms used to extract light from light guide (32) are not limited by using diffuse-reflecting spots on the back surface (42), and any other suitable mechanism could be used. Examples of extraction mechanisms include (but are not limited to) the formation of channels on the back surface (42), discontinuities associated with a pseudo-wedge light guide (32) and increased reflection angles within this wedge-shaped light guide, and posts connecting a reflector to the guide and ensuring diffuse light scattering within the guide. Ambient light entering the optical cavity (12) may strike a spot or it may escape from the light guide through the interstitial areas between spots. A diffuse-reflecting layer (34) is situated below the light guide (32) to intercept and reflect back such light beams. In the general case, all the light beams that emerge from the optical cavity (12) are depicted by arrow 35. These beams are incident onto an interference polar (I-Polar) (1) which transmits the light having the first polarization state (a) and effectively reflects light having the orthogonal polarization state (b). Consequently, a certain amount of light depicted by arrow (37) will be transmitted by I-Polar (1), while a substantial amount of the remaining light will be reflected back as indicated by arrow (36). The preferred I-Polar material is highly effective and the total losses due to absorption within I-Polar (1) are very low (on the order of 1%). This loss is indicated by arrow (38). The light with the polarization state (b) reflected by I-Polar (1) re-enters the optical cavity (12) where it strikes a diffuse-reflecting structure such as spots (33) or diffuse-reflecting layer (34). The diffuse-reflecting surfaces randomize the polarization state of the light reflected by optical cavity (12). This recirculation and randomization process is depicted as path (39). Optical cavity (12) is not a perfect reflector: optical losses in the cavity due to scattering and absorption are depicted by arrow (40). These losses are also low. Multiple recirculations effected by the combination of optical cavity (12) and I-Polar (1) provide an effective mechanism for converting light from the polarization state (b) to state (a) for ultimate transmission to the observer (17).

The efficiency of this process relies on a low absorption of I-Polar disclosed herein and the high reflecting and randomizing properties exhibited by many diffuse-reflecting surfaces.

The backlight modules described herein rely on the unique and advantageous properties of multilayer optical films. Multilayer optical films can be used, for example, as highly effective mirrors (reflectors) and polarizers. Brief description of the properties and characteristics of multilayer optical films used in conjunction with the present invention is presented below. Such multilayer optical films exhibit relatively low absorption of incident light, as well as high reflectivity for both normally incident and oblique light beams. These properties generally hold whether the films are used for pure reflection or reflective polarization of light. The unique properties and advantages of multilayer optical films provide an opportunity to design highly effective backlight modules exhibiting low absorption losses in comparison with backlight modules known in the prior art.

Figure 2A:
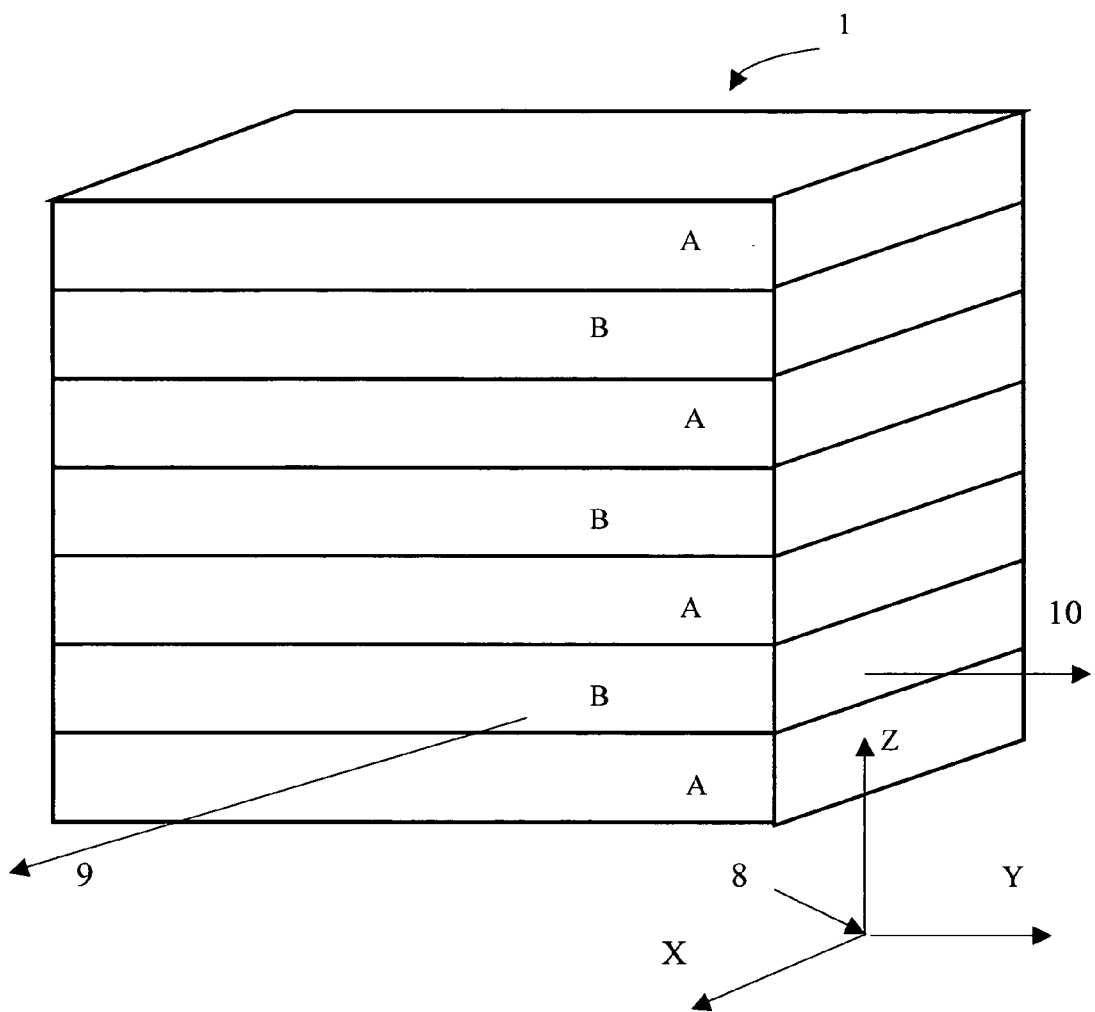
FIG. 2a shows the cross section of I-Polar comprising a stack of alternating layers.

FIG. 2a is a schematic diagram of the cross section of I-Polar (1). The figure shows a coordinate system (8) that defines X, Y and Z directions mentioned in the description of I-Polar (1). The illustrated I-Polar structure comprises alternating layers (ABABA . . . ) of two different polycyclic organic materials referred to as layer A and layer B throughout the drawings and description. The layers of two types are stacked one over another and the resulting multilayer structure (ABABA . . . ) is I-Polar. Anisotropic layers A can be obtained by the method called Cascade Crystallization Process developed by Optiva, Inc. [P. Lazarev and M. Paukshto, *Proceedings of the 7th International Workshop "Displays, Materials and Components"* (Kobe, Japan, Nov. 29-Dec. 1, 2000), pp. 1159-1160]. According to this method, an organic compound dissolved in an appropriate solvent forms a colloidal system (lyotropic liquid crystal solution) in which molecules are aggregated into supramolecules constituting kinetic units of the system. This liquid crystal phase is essentially a precursor of the ordered state of the system, from which a solid anisotropic crystal layer (sometimes also called thin crystal film, TCF) is formed in the course of subsequent alignment of supramolecules and removal of the solvent.

A method stipulated for the synthesis of anisotropic TCF from a colloidal system with supramolecules includes the following stages:

(i) application of the aforementioned colloidal system onto a substrate (or onto a device or a layer in a multilayer structure); the colloidal system must possess thixotropic properties, which are provided by maintaining a preset temperature and a certain concentration of the dispersed phase;

(ii) conversion of the applied colloidal system into a high flow (reduced viscosity) state by any external action (heating, shear straining, etc.) decreasing viscosity of the solution; this action can be either applied during the whole subsequent alignment stage or last for a minimum necessary time, so that the system would not relax into a state with increased viscosity during the alignment stage;

(iii) external alignment action upon the system, which can be produced using mechanical factors or by any other means; the degree of the external action must be sufficient for the kinetic units of the colloidal system to acquire the necessary orientation and form a structure that would serve as a base of the crystal lattice of the anisotropic thin crystal film;

(iv) conversion of the aligned region of the layer from the state of reduced viscosity, achieved due to the external action, into the state of the initial or higher viscosity; this transition is performed so as not to cause disorientation of the anisotropic thin crystal film structure and not to produce surface defects;

(v) final stage of solvent removal (drying), in the course of which the final anisotropic thin crystal film structure is formed.

In the resulting anisotropic layer, the molecular planes are parallel to each other and the molecules form a three-dimensional crystal structure, at least in a part of the layer. Optimization of the production technology may allow the formation of a single-crystal film.

The anisotropic layer thickness usually does not exceed 1 μm. The layer thickness can be controlled by changing the content of a solid substance in the applied solution and/or by varying the applied layer thickness. In order to obtain the layers possessing desired optical characteristics, it is possible to use mixed colloidal systems (such mixtures can form joint supramolecules).

The mixing of said organic compounds in solutions results in the formation of mixed aggregates of variable composition. The analysis of X-ray diffraction patterns of dye mixtures allows us to judge about the molecular packing in supramolecules by the presence of a characteristic diffraction peak corresponding to intermolecular distances in the range from 3.1 to 3.7 Å. In the general case, this value is common for aromatic compounds in the form of crystals and aggregates. The peak intensity and sharpness increase in the course of drying, but the peak position remains unchanged. This diffraction peak corresponds to the intermolecular spacing within aggregates (stacks) and has been observed in the X-ray diffraction patterns of various materials. The mixing is favored by the planar structure of molecules (or their fragments) and by the coincidence of one molecular dimension in the organic compounds under consideration. In the applied aqueous layer, the organic molecules possess a long-range order in one direction, which is related to the alignment of supramolecules on the substrate surface. As the solvent is evaporated, it is energetically favorable for the molecules to form a three-dimensional biaxial crystal structure. The chemical compound that can be used for this purpose are not limited to those listed above.

The anisotropic layers possess a high degree of optical anisotropy as well. Such layers exhibit the properties of E-type polarizers, which are related to peculiarities of the optical absorption of supramolecular complexes, and behave as retarders (phase-shifting films) in the spectral ranges where the absorption is insignificant. The retardation properties of these anisotropic layers are related to their birefringence (double refraction) that is, to a difference in refractive indices measured in the direction of application of the LLC solution onto a substrate and in the perpendicular direction. Layers formed from the LLC systems based on strong (lightfast) dye molecules are characterized by high thermal stability and light resistance. They remain stable in a temperature range of approximately 350-700° C.

Thus, optically anisotropic A layers are obtained by means of Cascade Crystallization Process. Such layers are characterized by a globally ordered biaxial crystalline structure with an intermolecular spacing of 3.4±0.3 Å in the direction of one of optical axes. Each A layer is characterized by at least two indexes of refraction: $n_x$ and $n_y$. These layers have a fundamental absorption edge below 400 nm, are uniformly transparent in the wavelength band of visible light, and have a transmission coefficient of not less than 0.98. Each A layer is formed by rodlike supramolecules, which represent at least one polycyclic organic compound with a conjugated π-system and ionogenic groups.

The X-axis is referred to below as the "alignment" direction while the Y-axis is referred to as the "transverse" direction.

Layers B are isotropic and have a nominal index of refraction (for example, n=1.64), which is not substantially altered by Cascade Crystallization Process.

Cascade Crystallization Process alters the index of refraction of TCFs representing layers A. TCFs have one index of refraction (for example, n=1.64) associated with the alignment direction and a different index of refraction (for example, n=1.88) associated with the transverse direction. By definition, the index of refraction associated with an in-plane axis (an axis parallel to the surface of the film) is called the "effective" index of refraction for the plane-polarized incident light whose plane of polarization is parallel to this axis.

Thus, the multilayer stack (TCF-B-TCF-B-TCF . . . ) has a large difference of refractive indices between layers ($\Delta n$=1.88−1.64=0.24) associated with the transverse direction. In the alignment direction, the indices of refraction of various layers are essentially the same ($\Delta n$=1.64−1.64=0). These optical characteristics allow the multilayer structures to transmit the polarization component of the incident light that is correctly oriented with respect to the "transmission" axis (9) shown in FIG. 2a. In the surveyed embodiment this transmission axis coincides with the alignment direction. The light emerging from I-Polar (1) is referred to as having the first polarization orientation (a).

The light not transmitted through interference polar (I-Polar) (1) has the polarization orientation (b) that differs from the first orientation (a). Light having the polarization orientation (b) will encounter the index of refraction differences, which results in reflection of this light. Thus, the transverse direction defines so-called "extinction" axis shown as axis (10) in FIG. 2a. In this manner, I-Polar (1) transmits light having the selected first polarization (a) and reflects light having the second polarization (b).

It is generally desirable that I-Polar would ensure maximum transmission of light polarized in the direction of the transmission axis over the wavelength band of interest and also over the range of angles of interest.

The average transmission of I-Polar at normal incidence for the light polarized along the transmission axis in the entire visible spectrum (400-700 nm, with a bandwidth of 300 nm) is desirably at least 50%, preferably at least 70%, more preferably at least 85%, and still more preferably at least 90%. The average transmission for such light incident at 60 degrees relative to the normal (measured along the transmission axis for p-polarized light) within the wavelength interval of 400-700 nm is desirably at least 50%, preferably at least 70%, more preferably at least 80%, and even more preferably at least 90%.

The average transmission of a multilayer I-Polar at normal incidence for light polarized in the direction of the extinction axis across the visible spectrum (400-700 nm, with a bandwidth of 300 nm) is desirably less than 50%, preferably less than 30%, more preferably less than 15%, and still more preferably less than 5%. The average transmission for such light incident at 60 degrees relative to the normal (measured along the transmission axis for p-polarized light) within the wavelength interval of 400-700 nm is desirably less than 50%, preferably less than 30%, more preferably less than 15%, and still more preferably less than 5%.

Although the interference polar (1) has been discussed with an exemplary multilayer structure of I-Polar including alternating layers of only two types, it should be understood that the interference polarizer may take a number of forms. For example, additional layers of other types may be included into the multilayer structure. In one embodiment of the disclosed backlight module, I-Polar may include at least one layer made of a fluorescent material converting ultraviolet radiation into visible light.

Let us turn to FIG. 1 again. A lamp cavity reflector (31) is depicted as partially surrounding light source (30) and coupling the same to light guide (32). Conventional lamp cavity reflector makes use of a silvered film possessing a reflectivity of about 96% in the visible spectral range, while other radiation is substantially absorbed by the reflector. Lamp cavity reflector (31) constructed using a reflective multilayer film according to the present invention, however, exhibits much higher reflectivity, typically about 98% or greater, which significantly reduces losses. In addition, as will be pointed out below, the multilayer film also has a high reflectivity-preferably at least 90%, more preferably 95%, and still more preferably at least 98%, for the light incident at an angle (for example, greater than 45°) relative to the normal.

Backlight modules incorporating a reflective multilayer film as the lamp cavity reflector (31) will typically exhibit approximately 20% or greater increase in brightness when a silvered optical film is replaced by a reflective multilayer film according to the present invention (under otherwise equal conditions). This increase can be largely attributed to the extremely low absorptivity and high reflectivity of this multilayer film.

In the backlight module, the lamp cavity reflector (31) is preferably integrated with the reflecting layer (34), either by laminating or otherwise attaching the two pieces together or by using one continuous sheet for both functions. As a result, there are essentially no losses associated with the interface between the two reflectors (31) and (34). In addition, such a design may simplify manufacturing of the backlight module. It can be also preferred in certain applications to laminate or otherwise similarly attach reflecting layer (34) to the back of light guide (32). This design eliminates the air gap between components, thus reducing surface reflections and increasing overall efficiency of the system.

In some particular cases, when a less effective reflective multilayer film is used as reflecting layer (34), it may be advantageous to provide reflecting layer (34) on the surface facing away from light guide (32) with a thin metal or other reflective coating to decrease losses through the reflective multilayer film (34), thereby improving the reflectivity of the reflective multilayer film (34). Of course, a metallic or other reflective coating may suffer from some absorption losses, but the fraction of light transmitted through film (34) will typically be less than 5% (more preferably less than about 1%) of the total light incident on film (34).

The reduction of optical losses in reflecting layer (34) is an especially important problem in the case of a polarized interference recycling backlight module, in which the light is repeatedly reflected from reflecting layer (34). As mentioned above, conventional reflecting layer will absorb or transmit from approximately 4 to 15% of incident light. The absorption losses are, of course, increased with every reflection of light from the surface of conventional reflectors. Even with the best conventional reflectors, which absorb 4% of incident light, the intensity level of reflected light is about 78.3% after only six reflections. In cases when the conventional reflector absorbs about 15% of incident light, the intensity level of reflected light drops to about 44.4% after only five reflections.

Although both the lamp cavity reflector (31) and reflecting layer (34) of backlight module according to the present invention are described as representing multilayer optical film, it will be understood that only one of the reflectors (31) or (34) can be made of such a multilayer optical film, while the other can employ conventional reflecting materials. However, such a design may not be preferred for certain applications due to excess absorption losses.

Figure 2B:
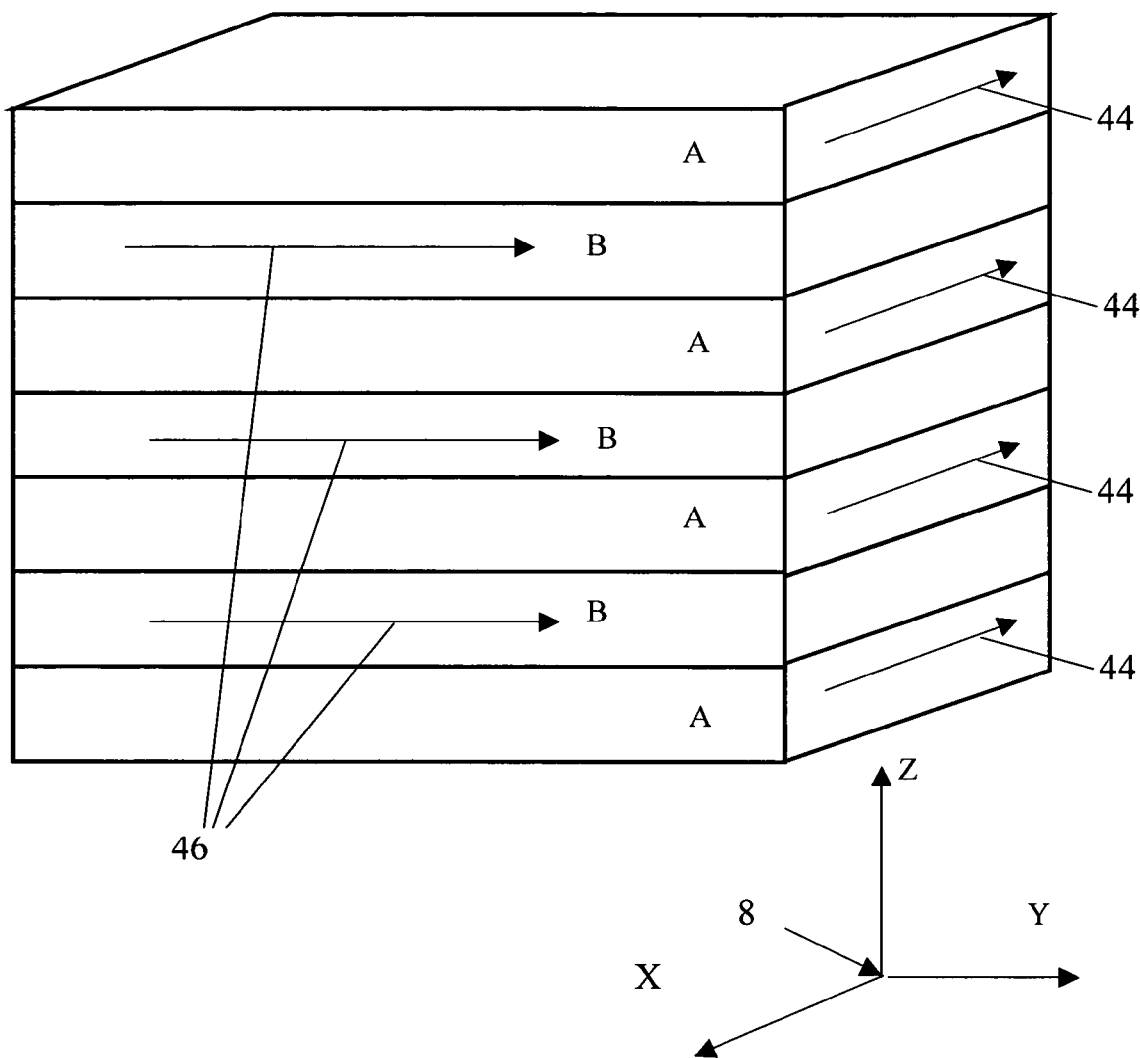
FIG. 2b shows the cross section of reflective multilayer film comprising a stack of alternating layers having mutually perpendicular alignment directions.

One way to obtain a reflective multilayer film is to biaxially stretch a multilayer stack containing a birefringent material as the high-index of refraction layer (H-layer) of the low/high index of refraction pair. Another way to obtain a reflective multilayer film is to fabricate the multilayer stack by Cascade Crystallization Process. In this case, the multilayer stack comprises alternating layers, which have mutually perpendicular alignment directions as shown in FIG. 2b, where arrows (44) and (46) indicate directions of alignment in adjacent layers of reflective multilayer film. The reflective multilayer film may include several layers, and each layer can be made of a different material. Criteria determining the choice of materials for a particular multilayer film depend upon the desired optical properties of the reflective multilayer film. The multilayer film may contain as many materials as there are layers in the film. For simple manufacturing, preferred reflective multilayer films should contain only a few different materials. Boundaries between layers of the same material or chemically identical materials with different physical properties can be sharp or smooth. Except for some simple cases of analytical solutions, analysis of the latter type of stratified media with continuously varying index of refraction is usually treated by considering a much greater number of thinner uniform layers having sharp boundaries with only a small change in properties between adjacent layers.

For a highly effective reflecting multilayer film, average transmission along each polarization direction at normal incidence over the entire visible spectrum (400-700 nm) is desirably less than 10% (reflectance greater than 90%), preferably less than 5% (reflectance greater than 95%), more preferably less than 2% (reflectance, greater than 98%), and still more preferably less than 1% (reflectance greater than 99%). The average transmission for the light incident at 60 degrees relative to the normal within the wavelength interval 400-700 nm is desirably less than 20% (reflectance greater than 80%), preferably less than 10% (reflectance greater than 90%), more preferably less than 5% (reflectance greater than 95%), and more preferably less than 2% (reflectance greater than 98%), and still more preferably less than 1% (reflectance greater than 99%).

Figure 3:
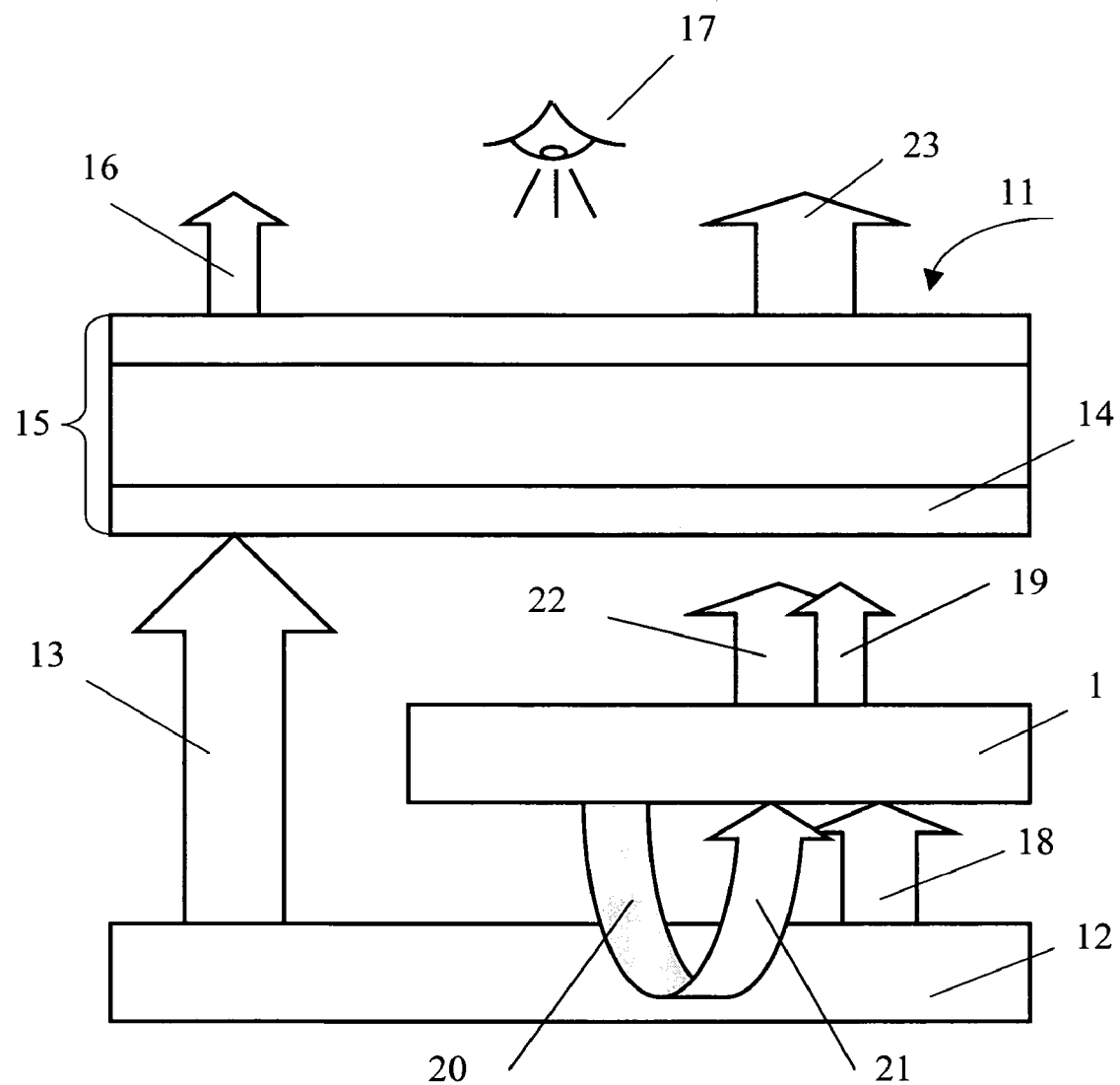
FIG. 3 is a schematic diagram intended for comparison of an optical displays with and without I-Polar.

FIG. 3 schematically shows a portion of optical display (11) without I-Polar (1) so as to compare the system performance with and without I-Polar. In the general case, the light beam emerging from a unit area of optical cavity (12) depicted by thick arrow (13) will be randomly polarized with both polarization states (a) and (b) present. Approximately half of this light-namely, light with the polarization state (b)—is absorbed by the dichroic absorbing polarizer (14), which forms a part of display cell (15). The remaining light with the polarization state (a) is transmitted through the dichroic absorbing polarizer (14). Thus, the light beam emerging from display cell (15) as depicted by arrow (16) represents the polarization state (a). Therefore, only light of state (a) is directed toward observer (17). The remaining light, having the polarization state (b), will be absorbed by the dichroic absorbing polarizer (14). Thus, only approximately half of the light intensity provided by optical cavity (12) actually contributes to the brightness of the display as viewed by observer (17).

In the same display, I-Polar operates so as to make more effective use of the light available from optical cavity (12). If the same unit amount of light, depicted by arrow (18), is directed to I-Polar (1), approximately half of the light-namely, that with the polarization state (a)—will pass through I-Polar (1) on the first pass. This light has the correct polarization to match the transmission axis of the dichroic absorbing polarizer (14) and is depicted by arrow (19). However, the remaining light having the polarization state (b) will be reflected back to the optical cavity by the I-Polar (1) as indicated by arrow (20). Some portion of this light will be randomized in terms of direction and polarization to state (a) by the optical cavity (12). Then, this light will emerge from the optical cavity with states (a) and (b) as indicated by arrow (21). The recirculated light with the polarization state (a) will then be added to the primarily transmitted light as depicted by arrow (22). Thus, the total amount of light depicted by arrows (22) and (19) is increased due to "recirculation". Because only light with the correct polarization state (a) matching the transmission axis of the dichroic absorbing polarizer (14) is passed through I-Polar (1), much more of the light emitted from the display as depicted by arrow (23) is directed toward the observer (17). Moreover, since the light with the polarization state (b) is reflected by I-Polar (1), very little of it is absorbed by the dichroic absorbing polarizer (14). The result is a display in which the light emerging toward the observer, depicted by arrow (23), may be 70% brighter than the light indicated by arrow (16).

Figure 4A:
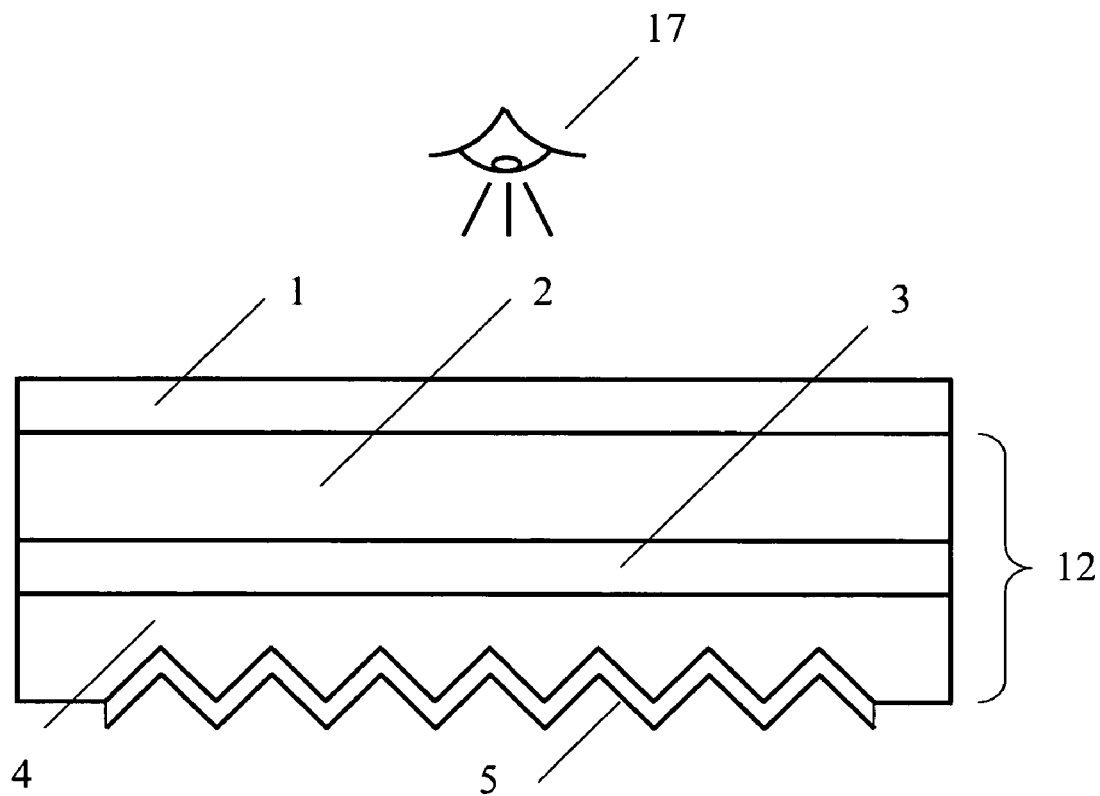
FIG. 4a is a schematic diagram of the backlight module according to one embodiment of the present invention, comprising I-Polar and a two-sided electroluminescent panel and a transparent substrate.

FIG. 4a shows the cross section of a polarized interference recycling backlight module according to one embodiment of the present invention. The backlight module is a layered structure comprising optical cavity (12) and I-Polar (1). The optical cavity includes a under plate (4), a two-sided electroluminescent panel (3), and a transparent substrate (2). The under plate (4) has a ridged rear surface covered with a reflective retardation film (5), which converts the light beams incident thereto in terms of polarization and reflects the converted light beams toward I-Polar (1). In this embodiment, the groove angle between any two neighboring ridges on the ridged rear surface of under plate (4) is 90°. However, any other groove angle suitable for reflection of the light beams thereto can be utilized. I-Polar (1) allows light beams with predetermined polarization state to be transmitted through and the beams with other polarizations to be reflected. For example, a structure of stacked layers can be utilized as I-Polar according to the present invention, so that the polarized light beam with one predetermined polarization state will be transmitted through the structure of stacked layers and the polarized light beam with another predetermined polarization state will be reflected. At least one anisotropic layer of the I-Polar is made by means of Cascade Crystallization Process as described in more detail above. In consideration of the production technology, substrate (2) can be made of any suitable optical material, for example, plastic or any type of glass.

It should be noted that, in one variant of the practical production, reflective retardation film (5) is a solid film formed by an optical-precision application process or deposited through evaporation onto the ridged rear surface of the under plate so as to reflect the light beams incident thereto back to the substrate. If the substrate is made of a material having a index of refraction of 1.53 with the criteria that the ridge angle on the rear surface of under plate is 90° and the wavelength of the incident light beam is in the interval from 400 to 700 nm, the typical composition of a multilayer reflecting film is $MgF_2$, ZnS, $CeF_3$, $MgF_2$, ZnS, $CeF_3$ and $MgF_2$ with the respective layer thickness, for example, 110.82, 20.13, 84.88, 141.93, 111.47, 84.88 and 25.38 nm.

Figure 4B:
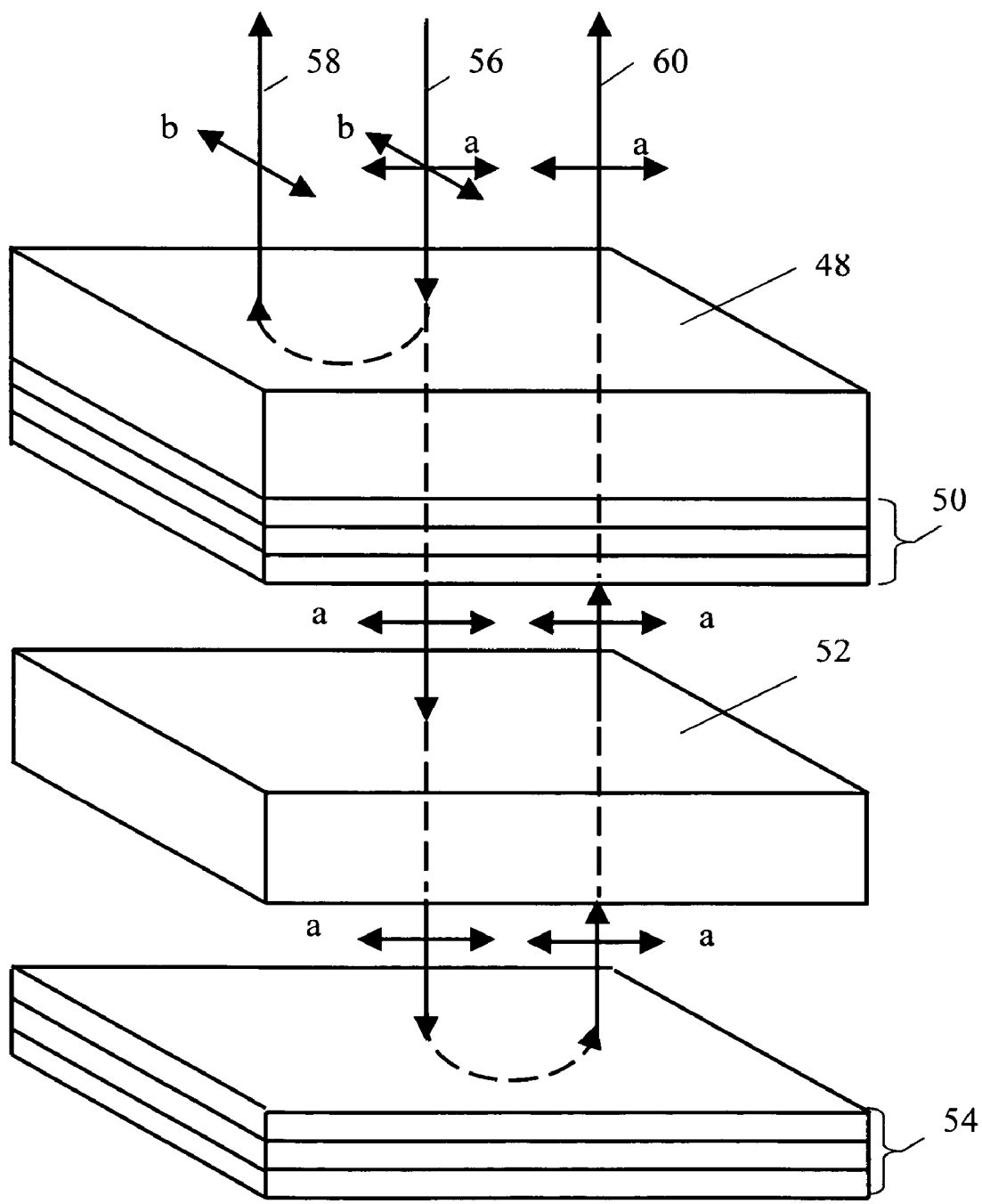
FIG. 4b is a schematic diagram of one embodiment of the reflective retardation film.

Another variant of the reflective retardation film (5) is shown in FIG. 4b. This reflective retardation film is a multilayer stack comprising a transparent substrate (48), first I-Polar (50), a phase adjusting layer (or layers) (52), and second I-Polar (54). The first I-Polar reflects the light having polarization state (b) and transmits the light having polarization state (a). The second I-Polar reflects the light having polarization state (a) and transmits the light having polarization state (b). The first I-Polar and second I-Polar are made by aforementioned manner. The first I-Polar comprises a stack of layers and the second I-Polar may also represent a multilayer film (only three layers are shown in FIG. 4*b* for the sake of simplicity). The phase adjusting layer (52) is indicated as being a single layer although it may also comprise a system of layers.

The nonpolarized incident light (56) is partially reflected and partially transmitted by the first I-Polar (50). Said I-Polar (50) reflects the component of light (58) having polarization state (b). The polarization component having polarization state (a) orthogonal to the polarization state (b) is transmitted through the first I-Polar (50). The second I-Polar (54) is designed to reflect the light wave having polarization state (a).

The light wave having polarization state (a) is transmitted through the first I-Polar (50) and phase adjusting layers (52) then reflected from the second I-Polar (54) and again is transmitted through the phase adjusting layer (52) and the first I-Polar (50). The phase of the reflected wave (60) having the a-polarization is retarded with respect to the reflected wave (58) with b-polarization so as to provide a predetermined phase difference between the reflected wave (58) and the reflected wave (60) as they incident onto the substrate (48). Preferably this temporal phase difference is 180 DEG, which results in a rotation of the plane of polarization such that the incident and emergent linear polarizations are orthogonal. Inasmuch as the reflected waves (58) and (60) are also rotated by predetermined angles, preferably 0 DEG and 180 DEG respectively with respect to their corresponding components in the incident light (56), the light within the substrate (48) will be linearly polarized such that the incident and reflected waves are polarized in orthogonal directions.

The phase change or phase difference $\phi_R$ will be seen by examination of FIG. 4*b* to be defined by the following equation: $\{[2\phi_{1T}+\phi_{2R}+2\delta]-\phi_{1R}\}=\phi_R$ where, $\phi_{1T}$ is the phase change on transmission for the light wave having the a-polarization state through the first I-Polar (50); $\phi_{2R}$ is the phase change upon reflection for the light wave having the a-polarization state from the second I-Polar (54); $\phi_{1R}$ is the phase change upon reflection from the first I-Polar (50), and $\delta$ is the optical thickness of the phase adjusting layer, $\delta=2\pi/\lambda$nd, where n is the refractive index, and d is the physical thickness.

The phase change $\phi_R$ depends upon the refractive indices and thicknesses of the thin layers used in the first I-Polar, second I-Polar and in the phase adjusting layer. These phase changes may be computed by methods known in the art.

Figure 5:
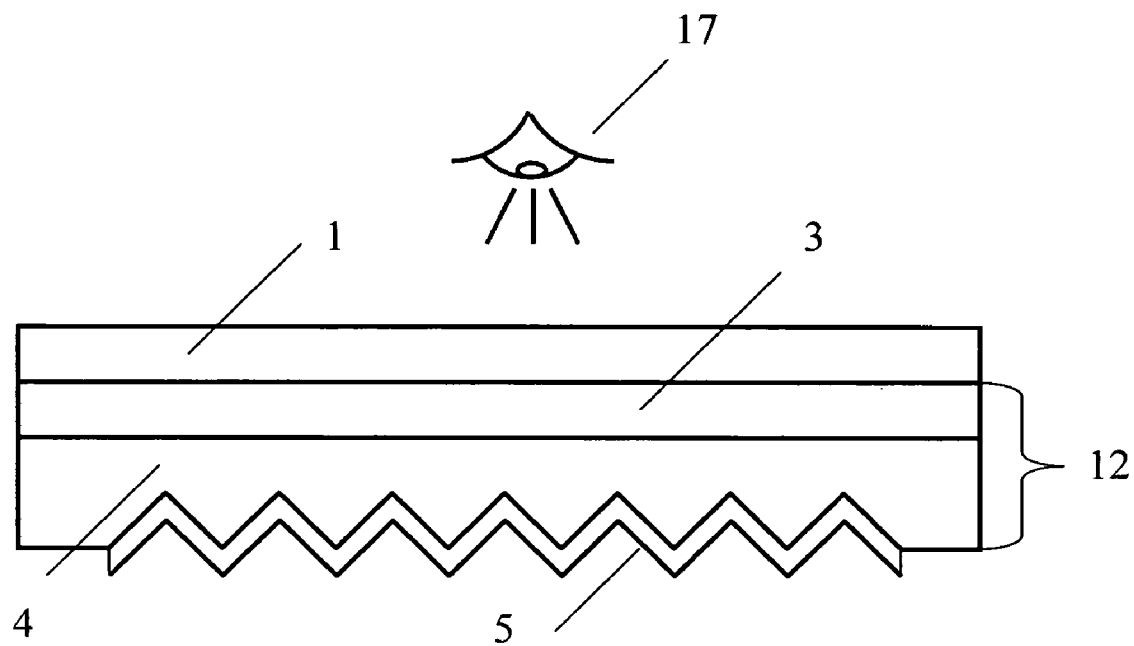
FIG. 5 is a schematic diagram of the backlight module according to another embodiment of the present invention, comprising I-Polar, a two-sided electroluminescent panel.

FIG. 5 shows the cross section of the polarized interference recycling backlight module according to another embodiment of the present invention. The backlight module is a layered structure comprising optical cavity (12) and I-Polar (1). The optical cavity comprises a under plate (4) and a two-sided electroluminescent panel (3). The under plate (4) has a ridged lower surface covered with a reflective retardation film (5), which converts the light beams incident thereto in terms of polarization and reflects the converted light beams toward I-Polar (1). In this embodiment, the groove angle between any two neighboring ridges on the ridged lower surface of the under plate (4) is 90°. However, any other groove angle suitable for reflection of the light beams thereto can be utilized. I-Polar (1) allows light beams with predetermined polarization state to be transmitted through and the beams with other predetermined polarizations to be reflected.

Figure 6:
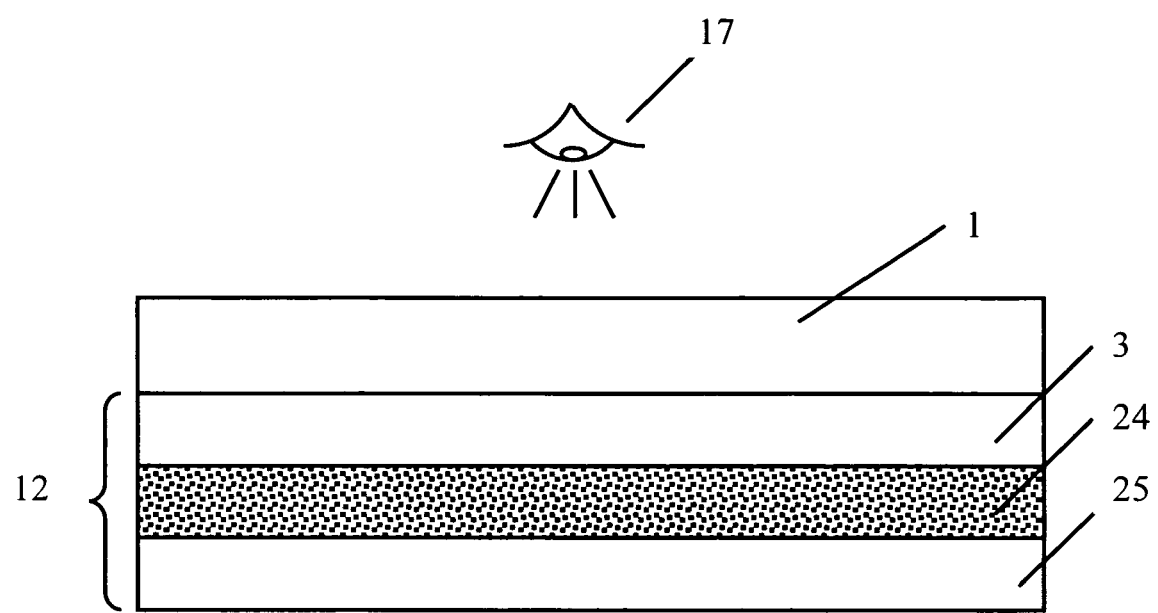
FIG. 6 is a schematic diagram of the backlight module according to one embodiment of the present invention, comprising I-Polar, a two-sided electroluminescent panel, and a light-scattering structure.

FIG. 6 shows a backlight module according to another embodiment of the present invention, comprising a two-sided electroluminescent panel (3) and a light-scattering structure (24). A reflective film of high reflectivity (25) is provided on the rear surface of the scattering structure (24). The I-Polar (1) is located between the observer (17) and the two-sided electroluminescent panel (3). Thus, the conversion of the polarization states of light beams according to the previous embodiments of the present invention may be achieved based on the scattering effect by the scattering structure (24). It should be noted that the scattering structure can be formed by a painting process or made of materials possessing different optical coefficients. In addition, the effect of scattering from this structure can be also achieved through a rough surface.

Figure 7:
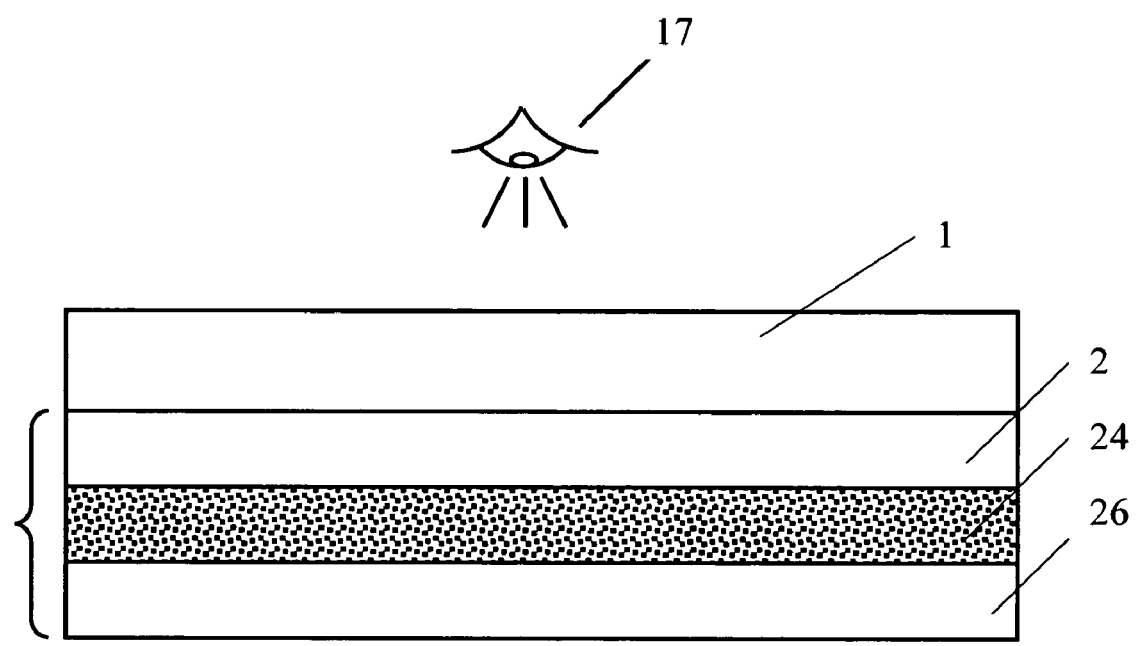
FIG. 7 is a schematic diagram of the backlight module according to one embodiment of the present invention, comprising I-Polar, a one-sided electroluminescent panel, and a light-scattering structure.

FIG. 7 shows a backlight module according to still another possible embodiment of the present invention. In this case, the light-scattering structure (24) is situated between the front surface of the one-sided electroluminescent panel (26) and the substrate (2), while the under plate is omitted. Similarly, the conversion of the polarization states of light beams can be achieved through the scattering from structure (24). The I-Polar (1) is located between the observer (17) and the substrate (2). In a possible variant, the substrate (2) can be also omitted to further simplify the construction of the backlight module.

Figure 8:
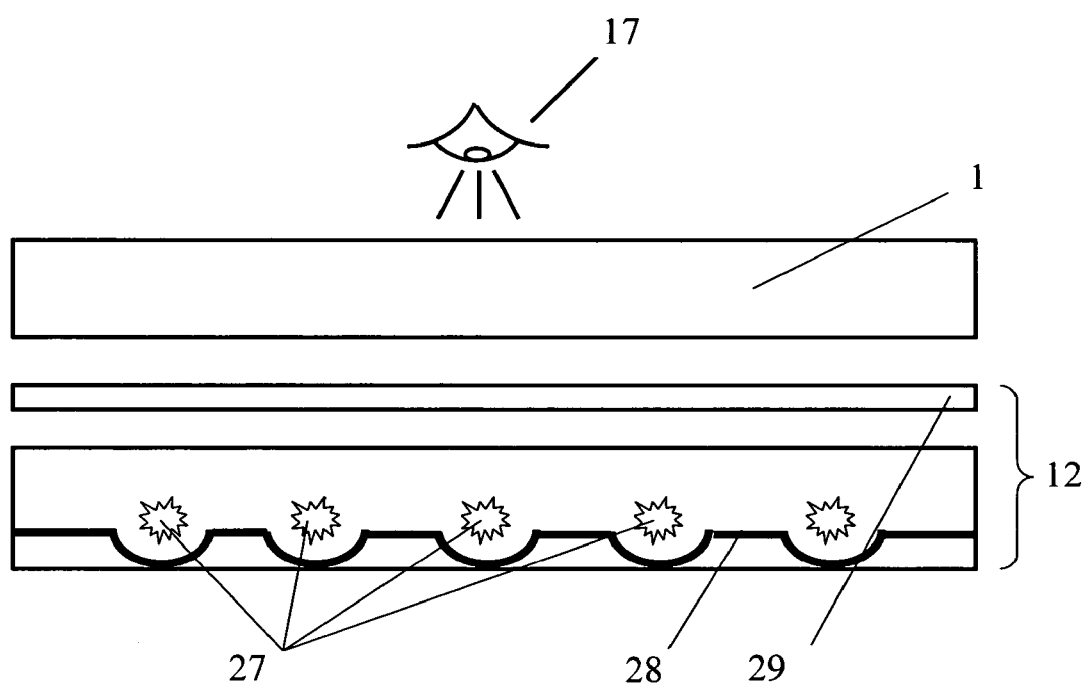
FIG. 8 is a schematic diagram of the backlight module according to the present invention, with an assembly of light sources.

The backlight module presented in FIG. 8 comprises an optical cavity (12) and I-Polar (1) situated between the observer (17) and the optical cavity (12). The optical cavity comprises a light source (27), reflector (28), and retardation plate (29) situated above the light source and reflector. The light source (27) is an assembly of light sources representing, for example, luminescent lamps or a LED matrix. Reflector (28) placed behind the backlight system provides for a more effective use of the source emission. The reflector can be of any type—specular or diffusive.

Description of Exemplary Embodiments

One preferred embodiment of the disclosed invention is a polarized interference recycling backlight module. The backlight module comprises an optical cavity serving as a light source, which is capable of reflecting and randomizing light incident upon a front surface of said optical cavity, and an I-Polar comprised of stacked layers, which is situated opposite the front surface of the optical cavity. Said I-Polar ensures transmission of light with predetermined polarization state and reflection of light with orthogonal polarization state in at least one region of the spectrum of light. At least one layer of said I-Polar is optically anisotropic and is made by means of Cascade Crystallization Process. This layer is characterized by a globally ordered biaxial crystal structure with an intermolecular spacing of 3.4±0.3 Å in the direction of one of the optical axes, is transparent in the visible spectral range, and is formed by rodlike supramolecules representing at least one polycyclic organic compound with a conjugated π-system and ionogenic groups.

In one embodiment of the disclosed backlight module, at least one layer of I-Polar is made of a fluorescent material converting ultraviolet radiation into visible light. In a possible variant of the disclosed backlight module, at least one layer of I-Polar has a fundamental absorption edge below 400 nm. In another possible variant of the disclosed backlight module, the I-Polar has a transmission coefficient of not less than 0.98. In still another possible variant of the disclosed backlight module, at least one layer of I-Polar is uniformly transparent in the visible spectral range.

In another preferred embodiment, the present invention provides a backlight module, wherein at least one optically anisotropic layer is treated with ions of divalent and/or trivalent metals. In another backlight module, the molecules of at least one organic compound material contain heterocycles. In one variant of the disclosed invention, the backlight module contains at least one optically anisotropic layer made of a lyotropic liquid crystal based on at least one dichroic dye.

In one variant of the disclosed backlight module, the optical cavity comprises a under plate with ridged rear surface facing the front surface of the optical cavity, a reflective retardation film deposited onto the ridged rear surface of said under plate, a two-sided electroluminescent panel (which serves as a light source) situated opposite the under plate, and a transparent substrate situated on said two-sided electroluminescent panel and having side surfaces. In one embodiment the backlight module further comprises reflective films deposited onto said side surfaces of the said substrate.

In another variant of the disclosed backlight module, the optical cavity comprises a under plate with a ridged rear surface, a reflective retardation film deposited onto the ridged rear surface of said under plate, and a two-sided electroluminescent panel (which serves as a light source) situated opposite the front surface of the under plate and a transparent substrate situated on the two-sided electroluminescent panel. In one embodiment said reflective retardation film provides rotation of the plane of polarization of the reflected light such that the incident and reflected light are polarized in orthogonal directions. Said reflective retardation film comprises a first I-Polar, second I-Polar and a phase adjusting layer located between said I-Polars. The first I-Polar reflects the light having predetermined polarization state (b) and transmits the light having polarization state (a) orthogonal with respect to polarization state (b) and the second I-Polar reflects the light having polarization state (a) and transmits the light having polarization state (b). The refractive index and physical thickness of the phase adjusting layer are selected thereby that said reflected light is polarized in a direction substantially orthogonal to the incident light.

In one embodiment of the backlight module the reflective retardation film is a solid film formed by an optical-precision application process. In still another variant of the disclosed backlight module, the optical cavity comprises a scattering structure having a front surface facing the front surface of the optical cavity and a rear surface, a reflective film disposed onto a rear surface of the scattering structure, and a two-sided electroluminescent panel situated opposite the front surface of the scattering structure.

In a possible variant of the disclosed backlight module, the optical cavity comprises a scattering structure having a front surface facing the front surface of the optical cavity and a rear surface, a substrate situated on a front surface of the scattering structure, and a one-sided electroluminescent panel situated on the rear surface of the scattering structure.

In still another variant, the backlight module includes a two-sided electroluminescent panel comprising an illuminating layer, an insulating layer, and two transparent electrodes. The illuminating layer and insulating layer are adjacent and situated between said transparent electrodes. In one variant of the disclosed invention, the backlight module further comprises reflective films disposed onto side surfaces of the substrate. In yet another variant, the backlight module comprises an undulated film disposed on the I-Polar for controlling the output angle and diffusion angle of light beams.

In a possible variant of the disclosed backlight module, the optical cavity further comprises (i) a light guide having a front surface facing the front surface of the optical cavity, a rear surface, and an edge, (ii) a light source optically connected to the edge of light guide and emitting light into the light guide, (iii) a retardation film located above the front surface of the light guide, and (iv) a rear reflector proximate the rear surface of the light guide, which comprises a reflective film which reflects at least about 80% of normal incident light and at least about 80% of light incident at an angle of 60° relative to the normal. In one embodiment the reflective multilayer film comprises alternating layers, which are made by means of Cascade Crystallization Process and have mutually perpendicular alignment directions. In one possible variant of the backlight module, the rear reflector reflects at least about 90% of normally incident light. In another variant of the backlight module, the rear reflector reflects at least about 95% of normally incident light. In yet another variant, the rear reflector reflects at least about 98% of normally incident light and in still another variant, the rear reflector reflects at least about 99% of normally incident light. In another possible variant of the backlight module, the rear reflector reflects at least about 90% of the light incident at an angle of 60° relative to the normal. In another variant of the backlight module, the rear reflector reflects at least about 95% of this light; in yet another variant, it reflects at least about 98% of said light, and in still another variant, the rear reflector reflects at least about 99% of the light incident at an angle of 60° relative to the normal.

In a possible variant of the disclosed invention, the backlight module further comprises special means ensuring diffuse reflection of light from the rear reflector toward the rear surface of the light guide. In one variant of the disclosed backlight module, the diffuse reflection is provided by particles dispersed within the reflective film. In another variant of the disclosed backlight module, this is provided by particles occurring on the surface of the reflective film. In still another variant of the disclosed backlight module, the diffuse reflection is provided by a film situated between the rear reflector and the rear surface of the light guide.

In yet another variant of the disclosed backlight module, the rear surface of the light guide is formed by the rear reflector.

In a possible embodiment of the disclosed invention, the backlight module further comprises a lamp cavity reflector located around a portion of the light source. This reflector, directing light from light source toward an edge of the light guide, can further comprise a reflective film reflecting at least about 80% of normally incident light and at least about 80% of light incident at an angle of 60 degrees relative to the normal.

In one possible variant of this backlight module, the lamp cavity reflector reflects at least about 90% of normally incident light. In another variant of the backlight module, the lamp cavity reflector reflects at least about 95% of normally incident light. In yet another variant, the reflector reflects at least about 98% of normally incident light, and in still another variant of the backlight module, it reflects at least about 99% of normally incident light.

In one variant of the disclosed backlight module, the lamp cavity reflector reflects at least about 90% of the light incident at an angle of 60 degrees relative to the normal. In another variant of the disclosed backlight module, the reflector reflects at least about 95% of this light. In yet another variant, the lamp cavity reflector reflects at least about 98% of the light incident at an angle of 60 degrees relative to the normal, and in still another variant, the reflector reflects at least about 99% of this light.

In one embodiment of the backlight module the reflective film is reflective multilayer film comprising alternating layers, which are made by means of Cascade Crystallization Process and have mutually perpendicular alignment directions. Said layers are optically anisotropic, characterized by a globally ordered biaxial crystalline structure with an intermolecular spacing of 3.4±0.3 Å in the direction of one of optical axes, are transparent in the wavelength band of visible light, and are formed by rodlike supramolecules, which represent at least one polycyclic organic compound with a conjugated π-system and ionogenic groups.

Another preferred embodiment of the disclosed invention is a liquid crystal display comprising a liquid crystal cell and a backlight module. The backlight module comprises an optical cavity serving as a light source. Said backlight module is capable of reflecting and randomizing light incident upon a front surface of said optical cavity. The backlight module comprises I-Polar comprising stacked layers, which is situated between the front surface of the optical cavity and the liquid crystal cell. Said I-Polar provides transmission of the radiation emitted from the light source with predetermined polarization state and reflection of the light of orthogonal polarizations in at least one region of the visible spectrum. At least one layer of said I-Polar is optically anisotropic and is made by means of Cascade Crystallization Process. This layer is characterized by a globally ordered biaxial crystalline structure with an intermolecular spacing of 3.4±0.3 Å in the direction of one of optical axes. Said layer is transparent in band of visible wavelength, and formed by rodlike supramolecules, which comprise at least one polycyclic organic compound with a conjugated π-system and ionogenic groups.

In one embodiment of the disclosed liquid crystal display, at least one layer of I-Polar is made of a fluorescent material converting ultraviolet radiation into visible light. In a possible variant of the disclosed liquid crystal display, at least one layer of I-Polar has a fundamental absorption edge below 400 nm. In another possible variant of the disclosed liquid crystal display, the I-Polar has a transmission coefficient of not less than 0.98. In still another possible variant of the disclosed liquid crystal display, at least one layer of I-Polar is uniformly transparent in the visible spectral range. In another liquid crystal display, the molecules of at least one organic compound material contain heterocycles. In one embodiment of the invention the liquid crystal display further comprises an anti-reflective coating located on the liquid crystal cell.

In order that the invention may be more readily understood, reference is made to the following examples, which are intended to be illustrative of the invention, but are not intended to be limiting in scope.

EXAMPLE 1

The typical interference polar (I-Polar) can be constructed using alternating layers of birefringent and isotropic materials deposited onto transparent substrate. Said interference polar has a transmission axis AB. If the unpolarized light is incident onto the interference polar, one part of this light, having the polarization approximately orthogonal to said transmission axis AB, is reflected from the interference polar. Desired performance can be achieved by manipulating the refractive index and thickness of each individual layer and the total number of layers. One of the most important aspects of the polarizer design is selection of the base structure. In the following consideration, normal incidence is assumed and the substrate index of refraction is fixed at 1.5. Typically, the interference polar can be designed in the form of a periodic structure of double layers with high and low refractive indices in the plane of polarization of the incident light. That is, the same pair of layers is repeatedly added until a satisfactory performance is achieved. The structure is of the form: $(HL)^{N-1}H$, where H and L denote the high and low index of refraction layers, respectively, and N is the number of pairs. Below, we refer such a structure to as the cavity containing a total of N high-index of refraction layers (H-layers). The structure yields maximum reflection at a specific wavelength, when the optical thickness (physical thickness multiplied by index of refraction) is equal to an odd number times a quarter of the wavelength (quarter-wave thickness).

Figure 9:
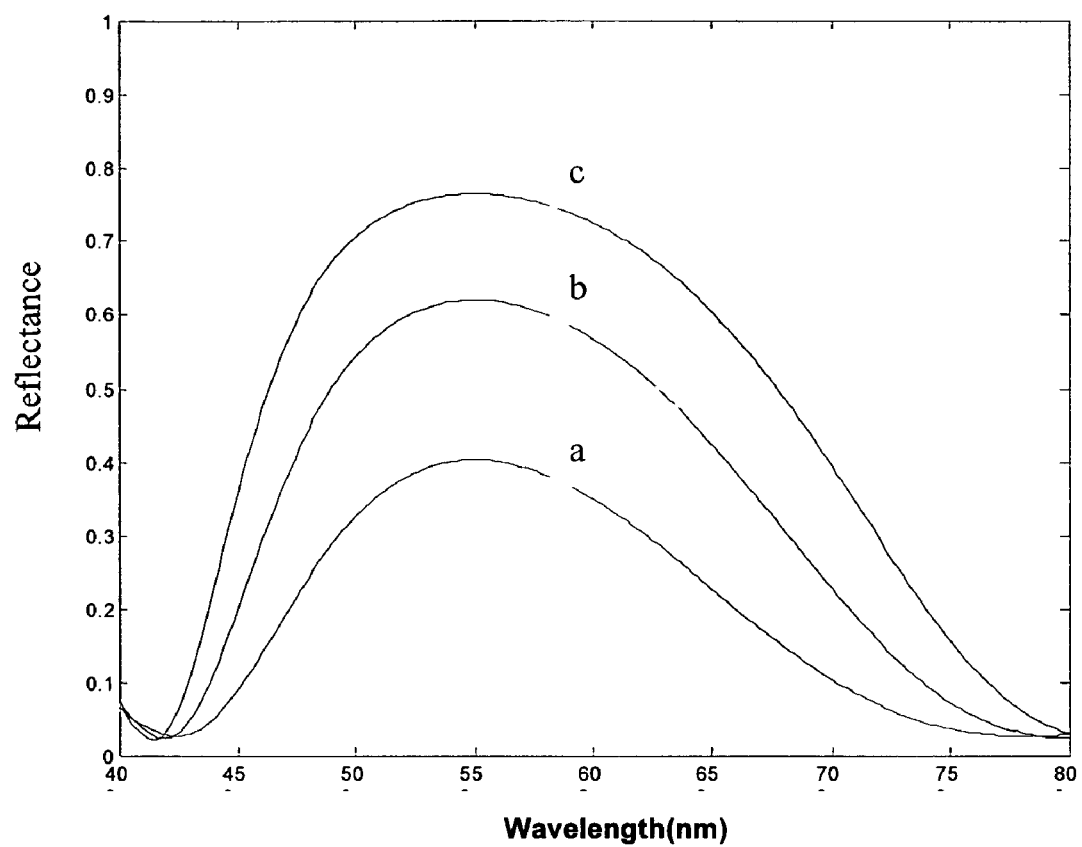
FIG. 9 shows the polarizer reflectance as a function of the wavelength for a three-layer (high-index of refraction) quarter-wave cavity with a low index of refraction fixed at 1.5.
Figure 10:
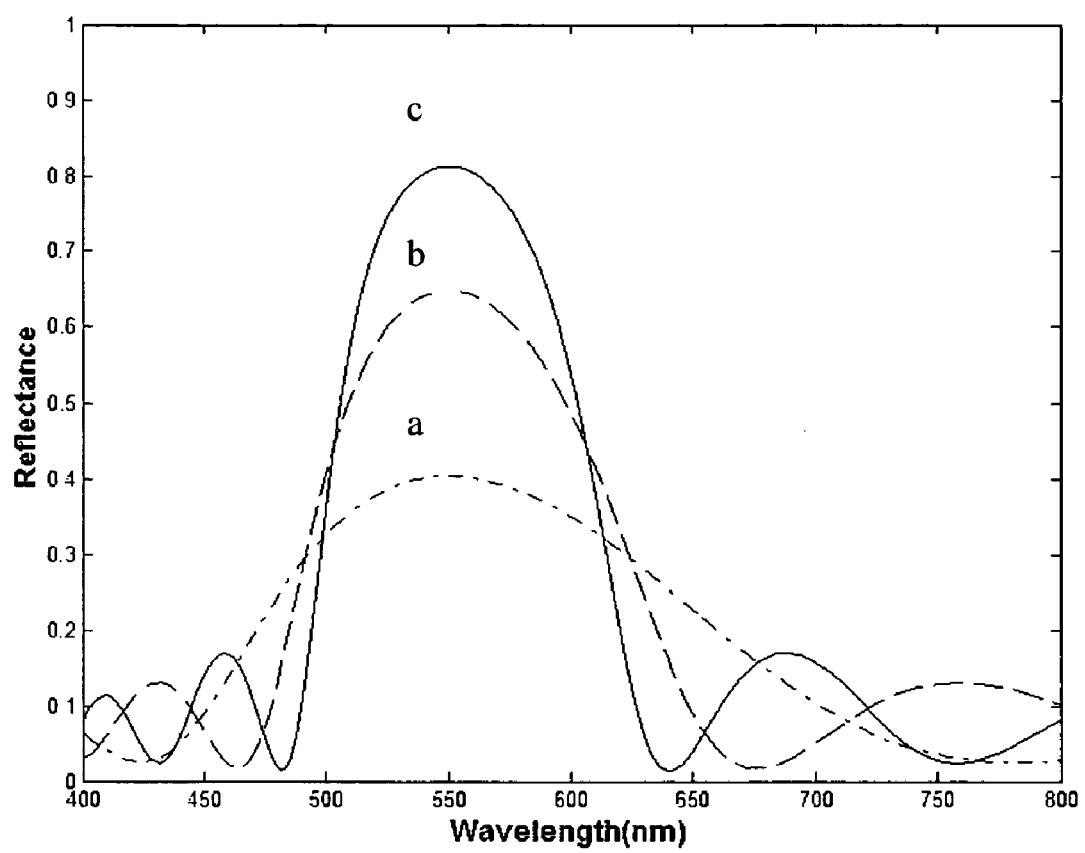
FIG. 10 shows the polarizer reflectance as a function of the wavelength for a quarter-wave cavity with various numbers of high-index of refraction layers (H-layers) (the high index of refraction is fixed at 1.8 and the low index of refraction, at 1.5).

Although designing the interference polar for a single wavelength is not the purpose, the result may provide some insight and guidelines for designing real interference polars. FIGS. 9 and 10 illustrate the effects of the refractive index and the number of layers on the reflectance of a system under consideration. The materials are deposited onto the substrate. The incident light penetrates through the multilayer structure, and exits from the substrate. FIG. 9 shows the reflectance of a three-layer (high-index of refraction) structure with the low index of refraction fixed at 1.5 and the other index of refraction varied from 1.8 (a) to 2.0 (b) and 2.2 (c). The optical thickness is a quarter of 550 nm. Both the reflectance and bandwidth increase as the index of refraction contrast increases. With only three H-index of refraction layers, the reflectance can reach 80%. FIG. 10 shows the case where both indices are fixed at 1.5 and 1.8 and the number of H-layers varies from 3 (a) to 5 (b) and 7 (c). As the number of H-layers increases, the reflectance grows dramatically and falls more abruptly from high values to an oscillatory level.

One practical issue with FIGS. 9 and 10 is that the layer thickness may be too small for accurate manufacturing control. In the visible wavelength range from 400 to 700 nm, the physical thickness is 55 to 97 nm for an index of refraction of 1.8. The optical thickness may be equal to the odd number (say, 3 or 5) of quarter-waves. However, an increase in the thickness decreases the bandwidth.

It is obvious that a single cavity offers reflection narrowly concentrated around a single wavelength, with the bandwidth depending on the index of refraction contrast and the number of layers in the cavity. Therefore, multicavity structures are of interest. In such structures, each cavity centers at a different wavelength. Such structures can be written as $$(H_1L_1)^{N-1}H_1C_{12}(H_2L_2)^{N-1}H_2C_{23}\ldots(H_mL_m)^{N-1}H_m,$$

where $C_{12}$ represents the coupling layer between cavity 1 and cavity 2. The $C_{12}$ value is usually chosen as the mean of $L_1$ and $L_2$. In addition, wavelength spacing between cavities should be chosen carefully based on the bandwidth of each cavity. The narrower the bandwidth, the smaller spacing should be chosen.

Figure 11:
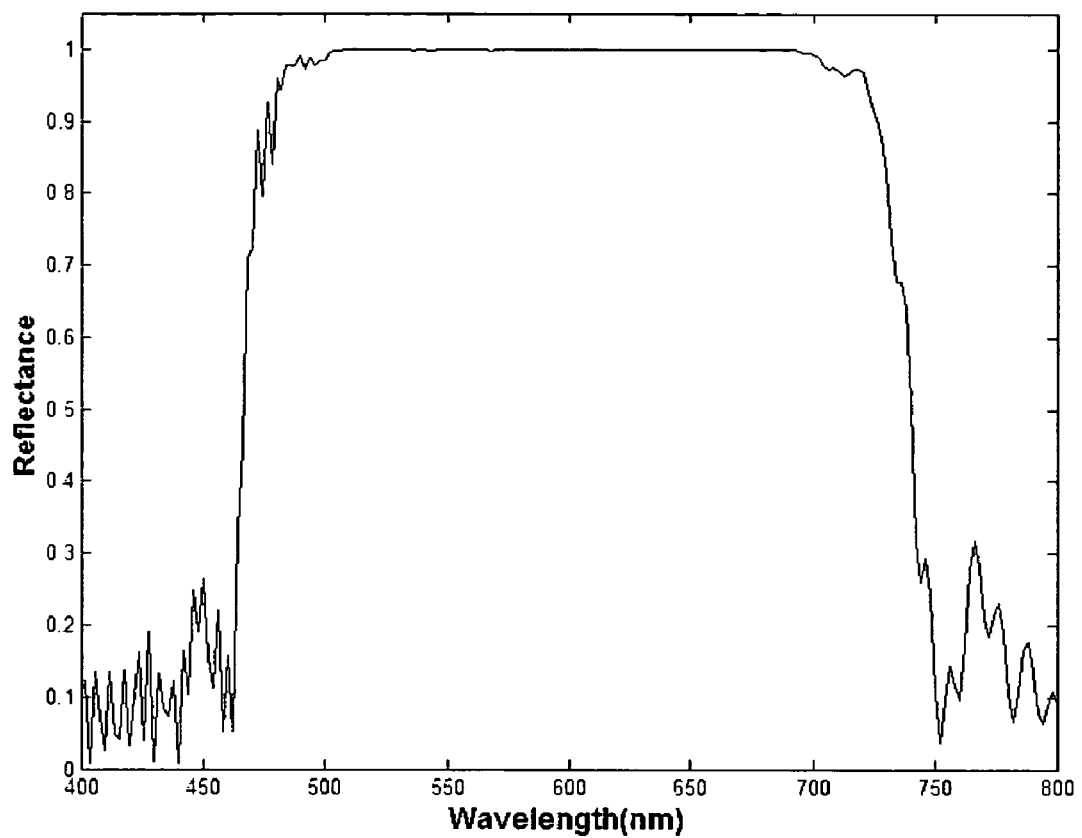
FIG. 11 shows the polarizer reflectance as a function of the wavelength for a structure of six quarter-wave cavities having 15 H-layers (the high index of refraction is fixed at 1.8 and the low index of refraction, at 1.5).

FIG. 11 shows the reflectance spectrum of a nearly perfect broadband multilayer lossless polarizer comprising six cavities with 15 H-layers in each cavity (a total of 95 H-layers). It can be seen that nearly 100% reflection is achieved in the band from 500 nm to 700 nm. If the high index of refraction is 2.2, we could achieve the same performance using only 4 cavities, each consisting of seven layers (a total of 28 H-layers).

In all the above cases, the layer thickness is one quarter-wave in each cavity. Let us now reexamine the issue of increasing layer thickness. As was indicated above, the bandwidth decreases as the layer thickness grows. This implies that more cavities are needed to cover the same range of wavelengths. For example, if the thickness is to be three quarter-waves, it is necessary to use 11 cavities, each having 17 H-layers (a total of 187 H-layers) to achieve a performance similar to that in FIG. 11. This more than doubles the number of layers as compared to that in the case of thinner layers.

Figure 12:
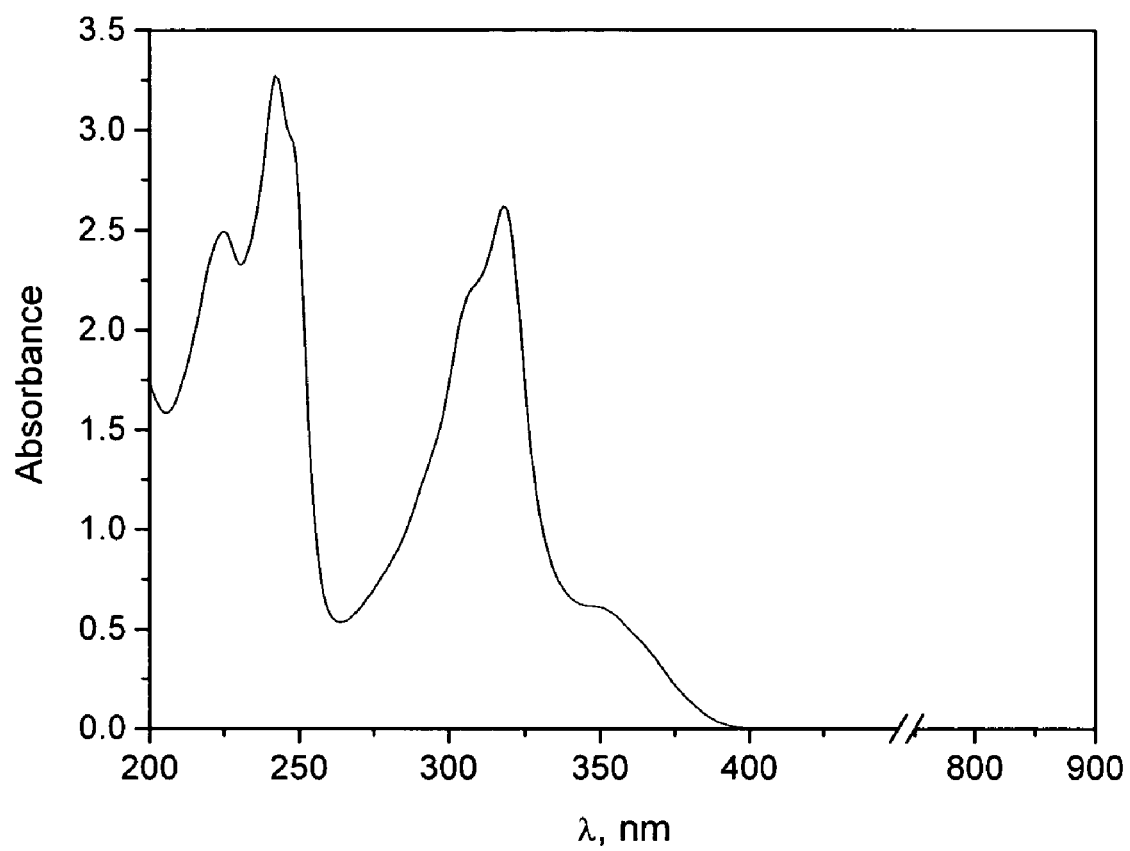
FIG. 12 is an absorption spectrum for aqueous solution of sulfonated acenaphtho[1,2-b]quinoxaline with a concentration 25 mg/l.

The interference polar layers were obtained by means of Cascade Crystallization Process and analyzed to determine the optical characteristics of layers. A mixture of sulfoderivatives of acenaphtho[1,2-b]quinoxaline (12 g) was introduced with stirring at a temperature of 20° C. into 65.0 g of deionized water. Then, 5.3 ml of 25% aqueous ammonia solution were added and the mixture was stirred to complete dissolution. The electronic absorption spectrum of an aqueous solution of sulfonated acenaphtho[1,2-b]quinoxaline is presented in FIG. 12. The solution was concentrated on a rotary evaporator to 30% and layered on a glass substrate surface with a Mayer rod #2.5 at a linear rate of 15 mm/s, a temperature of 20° C. This process was performed at a relative humidity of 65%. Then, the film was dried at the same humidity and temperature.

Figure 13:
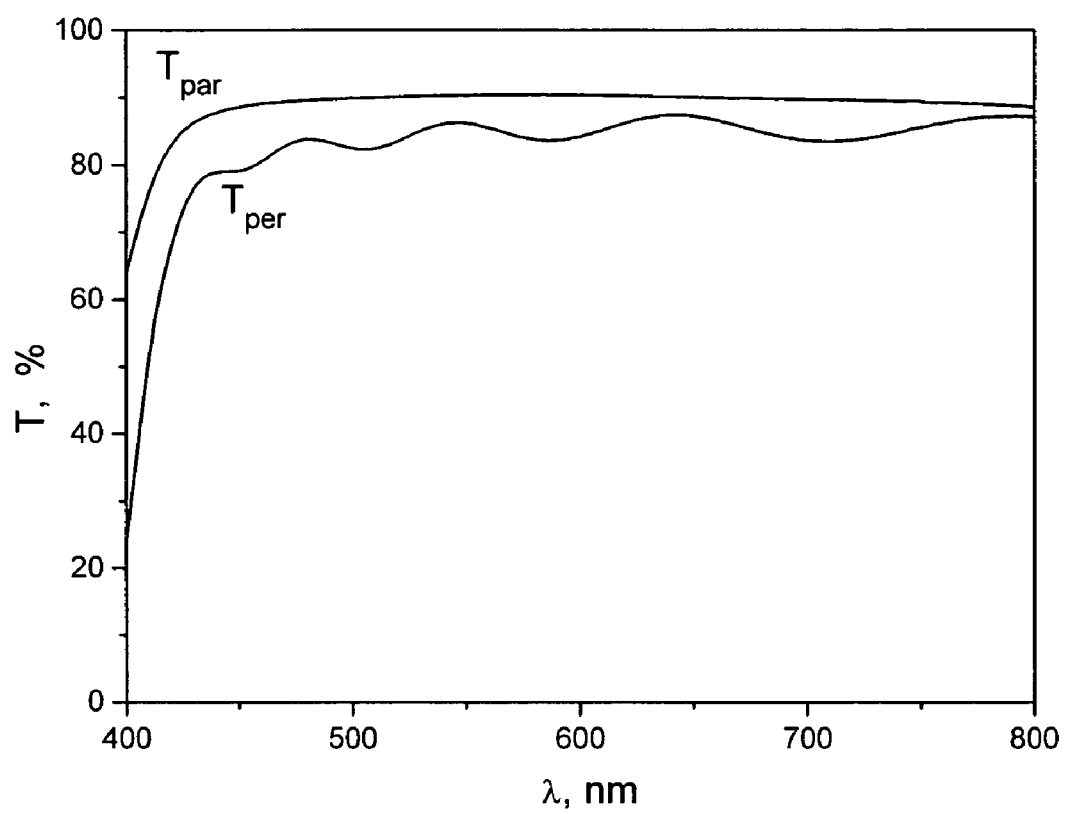
FIG. 13 is a transmission spectrum illustrating the dependence of the transmission coefficients vs. wavelength for a layer produced from the mixture of sulfonated acenaphtho[1,2-b]quinoxaline derivatives.

To determine optical characteristics of the film, optical transmission spectra were measured in polarized light in the wavelength range from 400 to 800 nm using a Cary-500 spectrophotometer (FIG. 13). We measured optical transmission of the film using the light linearly polarized parallel and perpendicular to the polarization axes ($T_{par}$ and $T_{per}$ respectively) of the polarizer and analyzer. FIG. 13 demonstrates a very low absorbance of the film in the visible spectral range at wavelengths above 430 nm.

Figure 14:
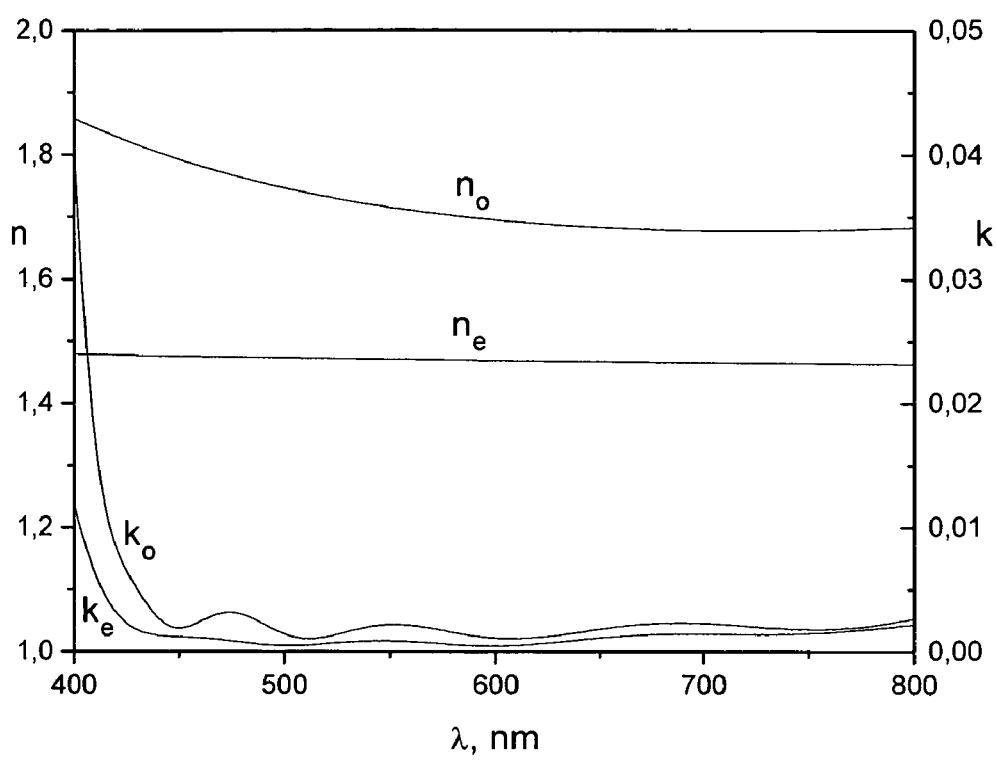
FIG. 14 shows the dependences of refraction indices ($n_e$, $n_o$) and absorption coefficients ($k_e$, $k_o$) on the wavelength for a layer produced from the mixture of sulfonated acenaphtho[1,2-b]quinoxaline derivatives, measured parallel and perpendicular to the alignment direction.

The obtained data were used to calculate the refractive indices ($n_e$, $n_o$) and absorption coefficients ($k_e$, $k_o$) for the light polarized parallel and perpendicular to the alignment direction. The calculated coefficients are presented in FIG. 14. The obtained layer is optically anisotropic and exhibits high retardation characteristic $\Delta n = n_o - n_e$ increasing from 0.21 up to 0.38 in the visible spectral range. The low values of the absorption coefficients $k_e$ and $k_o$ confirm high transparency of the layer.

Figure 15:
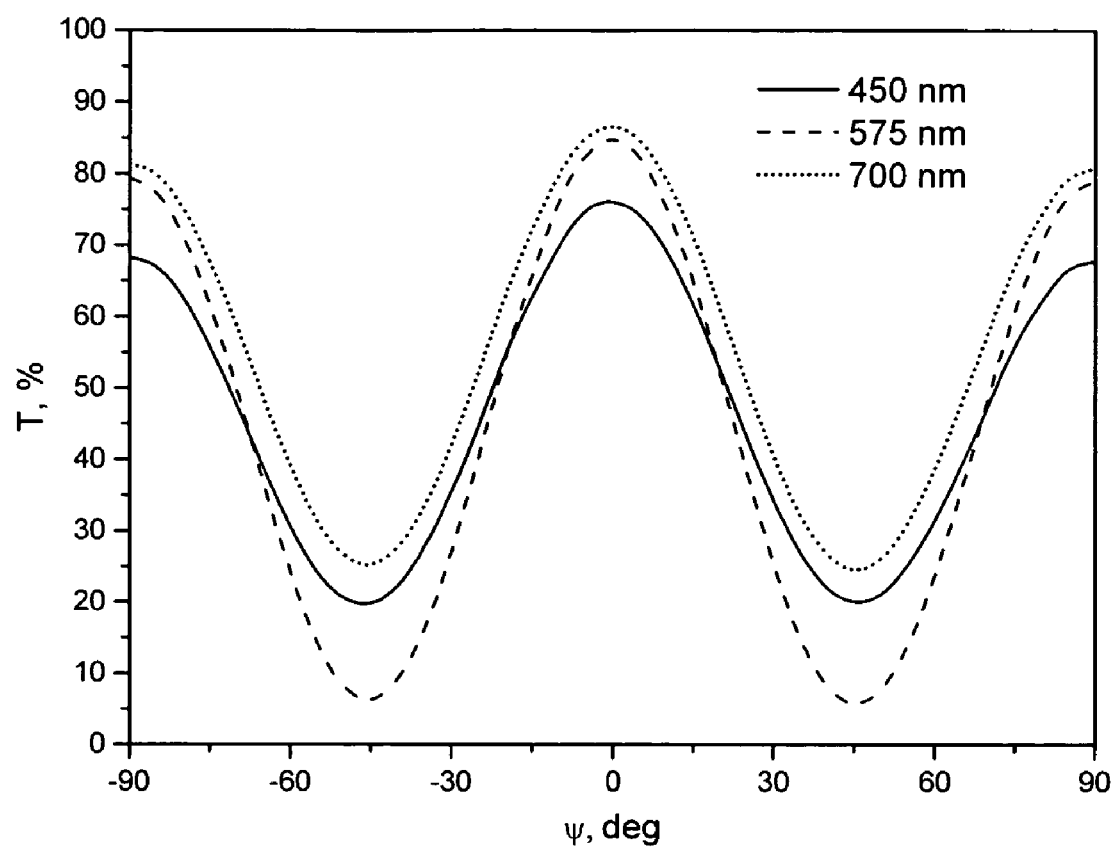
FIG. 15 is the plot of transmission vs. rotating angle for wavelengths 450, 575, and 700 nm measured in a structure with an optically anisotropic layer placed between parallel polarizes.

FIG. 15 shows transmission vs. rotation angle measured at wavelengths 450 nm, 575 nm, and 700 nm for a structure with an optically anisotropic layer situated between parallel polarizes. The transmission axis corresponds to the angle 0°. The absorption axis corresponds to the angles −90° and 90°. These measurements allow us to observe rotation of the polarization plane when polarized light passes through the layer.

What is claimed is:

1. A polarized interference recycling backlight module, comprising
    an optical cavity serving as a light source, and reflecting and randomizing light that is incident upon a front surface of said optical cavity,
    an I-Polar comprising stacked layers,
    wherein said I-polar is situated opposite the front surface of the optical cavity and ensures transmission of light with a predetermined polarization state and reflection of light with orthogonal polarization state in at least one region of the spectrum of light, and
    wherein at least one layer of said I-Polar is optically anisotropic, being made by means of Cascade Crystallization Process and characterized by a globally ordered biaxial crystalline structure with an intermolecular spacing of 3.4±0.3 Å in the direction of one of optical axes, is transparent throughout the visible spectral range, and is formed by rodlike supramolecules, which represent at least one polycyclic organic compound with a conjugated π-system and ionogenic groups.

2. The backlight module according to the claim 1, wherein at least one layer of the I-Polar is made of a fluorescent material converting ultraviolet radiation into visible light.

3. The backlight module according to the claim 1, wherein at least one layer of the I-Polar has a fundamental absorption edge below 400 nm.

4. The backlight module according to the claim 1, wherein the I-Polar has a transmission coefficient of not less than 0.98.

5. The backlight module according to the claim 1, wherein at least one layer of the I-Polar is uniformly transparent in the visible spectral range.

6. The backlight module according to the claim 1, wherein at least one optically anisotropic layer is treated with ions of divalent and/or trivalent metals.

7. The backlight module according to the claim 1, wherein molecules of at least one said organic compound contains heterocycles.

8. The backlight module according to the claim 1, wherein at least one optically anisotropic layer is formed by a lyotropic liquid crystal based on at least one dichroic dye.

9. The backlight module according to the claim 1, wherein the optical cavity further comprises
    an under plate having a front surface facing the front surface of the optical cavity and a ridged rear surface;
    a reflective retardation film disposed onto the ridged rear surface of the under plate;
    a two-sided electroluminescent panel, situated opposite the front surface of the under plate; and
    a transparent substrate situated on the two-sided electroluminescent panel and having side surfaces.

10. The backlight module according to the claim 1, wherein the optical cavity further comprises
    an under plate having a front surface facing the front surface of the optical cavity and a ridged rear surface;
    a reflective retardation film deposited onto the ridged rear surface of the under plate; and
    a two-sided electroluminescent panel, situated opposite the front surface of the under plate.

11. The backlight module according to any of claims 9 or 10, wherein the reflective retardation film provides rotation of the plane of polarization of the reflected light such that the incident and reflected light are polarized in orthogonal directions and comprises a first I-Polar, a second I-Polar and a phase adjusting layer located between said I-Polars, wherein the first I-Polar reflects the light having predetermined polarization state (b) and transmits the light having polarization state (a) orthogonal with respect to polarization state (b) and the second I-Polar reflects the light having polarization state (a) and transmits the light having polarization state (b), wherein index of refraction and physical thickness of the phase adjusting layer are selected whereby said reflected light is polarized in a direction substantially orthogonal to the incident light.

12. The backlight module according to any of claims 9 or 10, wherein the reflective retardation film is a solid film formed by an optical-precision application process.

13. The backlight module according to the claim 1, wherein the optical cavity further comprises
    a scattering structure having a front surface facing the front surface of the optical cavity and a rear surface,
    a reflective film disposed onto the rear surface of the scattering structure, and
    a two-sided electroluminescent panel situated opposite the front surface of the scattering structure.

14. The backlight module according to the claim 1, wherein the optical cavity further comprises
    a scattering structure having a front surface facing the front surface of the optical cavity and a rear surface,
    a substrate situated on the front surface of the scattering structure, and
    a one-sided electroluminescent panel situated on the rear surface of the scattering structure.

15. The backlight module according to any of claims 9, 10 or 13, wherein the two-sided electroluminescent panel comprises an illuminating layer, insulating layer, and two transparent electrodes, wherein said layers are adjacent and situated between said electrodes.

16. The backlight module according to claim 9, further comprising reflective films disposed onto said side surfaces of the substrate.

17. The backlight module according to claim 1, further comprising an undulated film disposed on the I-Polar for controlling an output angle and diffusion angle of the light.

18. The backlight module according to the claim 1, wherein the optical cavity further comprises
a light guide having a front surface facing the front surface of the optical cavity, a rear surface, and an edge;
a light source optically connected to the edge of the light guide and emitting light into the light guide;
a retardation film located above the front surface of the light guide, and
a rear reflector proximate the rear surface of the light guide and comprising a reflective film which reflects at least about 80% of normally incident light and at least about 80% of the light incident at an angle of 60 degrees from normal.

19. The backlight module according to claim 18, wherein the rear reflector is configured to reflect at least about 90% of normally incident light.

20. The backlight module according to claim 18, wherein the rear reflector is configured to reflect at least about 95% of normally incident light.

21. The backlight module according to claim 18, wherein the rear reflector is configured to reflect at least about 98% of normally incident light.

22. The backlight module according to claim 18, wherein the rear reflector is configured to reflect at least about 99% of normally incident light.

23. The backlight module according to claim 18, wherein the rear reflector is configured to reflect at least about 90% of the light incident at an angle of 60 degrees from normal.

24. The backlight module according to claim 18, wherein the rear reflector is configured to reflect at least about 95% of the light incident at an angle of 60 degrees from normal.

25. The backlight module according to claim 18, wherein the rear reflector is configured to reflect at least about 98% of the light incident at an angle of 60 degrees from normal.

26. The backlight module according to claim 18, wherein the rear reflector is configured to reflect at least about 99% of the light incident at an angle of 60 degrees from normal.

27. The backlight module according to claim 18, further comprising diffusing means for diffusing light reflected from the rear reflector towards the rear surface of the light guide.

28. The backlight module according to claim 27, wherein the diffusing means comprises diffusing particles within the reflective film.

29. The backlight module according to claim 27, wherein the diffusing means comprises diffusing particles located on a surface of the reflective film.

30. The backlight module according to claim 27, wherein the diffusing means comprises a diffusing film located between the rear reflector and the rear surface of the light guide.

31. The backlight module according to claim 18, wherein the rear surface of the light guide is formed by the rear reflector.

32. The backlight module according to claim 18, further comprising a lamp cavity reflector located around a portion of the light source, the lamp cavity reflector directing light from light source towards an edge of the light guide, the lamp cavity reflector comprising a reflective film which is configured to reflect at least about 80% of normally incident light and at least about 80% of light incident at an angle of 60 degrees from normal.

33. The backlight module according to claim 32, wherein the lamp cavity reflector is configured to reflect at least about 90% of normally incident light.

34. The backlight module according to claim 32, wherein the lamp cavity reflector is configured to reflect at least about 95% of normally incident light.

35. The backlight module according to claim 32, wherein the lamp cavity reflector is configured to reflect at least about 98% of normally incident light.

36. The backlight module according to claim 32, wherein the lamp cavity reflector is configured to reflect at least about 99% of normally incident light.

37. The backlight module according to claim 32, wherein the lamp cavity reflector is configured to reflect at least about 90% of the light incident at an angle of 60 degrees from normal.

38. The backlight module according to claim 32, wherein the lamp cavity reflector is configured to reflect at least about 95% of the light incident at an angle of 60 degrees from normal.

39. The backlight module according to claim 32, wherein the lamp cavity reflector is configured to reflect at least about 98% of the light incident at an angle of 60 degrees from normal.

40. The backlight module according to claim 32, wherein the lamp cavity reflector is configured to reflect at least about 99% of the light incident at an angle of 60 degrees from normal.

41. The backlight module according to any of claims 13, 16, 18, 28, 29 or 32, wherein the reflective film is a reflective multilayer film comprising alternating layers, which are made by means of Cascade Crystallization Process and have mutually perpendicular alignment directions, wherein said layers are optically anisotropic, characterized by a globally ordered biaxial crystalline structure with an intermolecular spacing of 3.4±0.3 Å in the direction of one of optical axes, are transparent in the wavelength band of visible light, and are formed by rodlike supramolecules, which represent at least one polycyclic organic compound with a conjugated π-system and organic groups.

42. A liquid crystal display, comprising
a liquid crystal cell, and
a backlight module, comprising
an optical cavity serving as a light source, reflecting and randomizing light incident upon a front surface of said optical cavity, and
an I-Polar comprising stacked layers,
wherein said I-Polar is situated between the front surface of the optical cavity and the liquid crystal cell,-configured to provide transmission of light with a predetermined polarization state and reflection of light with orthogonal polarization state in at least one region of the spectrum of light, and
wherein at least one layer of said I-Polar is optically anisotropic and made by means of Cascade Crystallization Process and characterized by a globally ordered biaxial crystalline structure with an intermolecular spacing of 3.4±0.3 Å in the direction of one of optical axes, is transparent throughout the visible spectral range, and formed by rodlike supramoleculaes, which comprise at least one polycyclic organic compound with a conjugated π-system and ionogenic groups.

43. The liquid crystal display according to claim 42, wherein at least one layer of the I-Polar is made of a fluorescent material converting ultraviolet radiation into visible light.

44. The liquid crystal display according to claim 42, wherein at least one layer of the I-Polar has a fundamental absorption edge below 400 nm.

45. The liquid crystal display according to claim 42, wherein the I-Polar is configured to have a transmission coefficient of not less than 0.98.

46. The liquid crystal display according to claim 42, wherein at least one layer of the I-Polar is uniformly transparent in the visible spectral range.

47. The liquid crystal display according to claim 42, wherein molecules of at least one said organic compound contains heterocycles.

48. The liquid crystal display according to claim 42, further comprising an anti-reflective coating located on the liquid crystal cell.

49. The backlight module according to claim 5, wherein at least one layer of said I-Polar shows transmission coefficient varying not more than 5% across a wavelength range of 450-800 nm to parallel polarized light.

50. The backlight module according to claim 5, wherein at least one layer of said I-Polar shows transmission coefficient varying not more than 75% across a wavelength range of 450-800 nm to perpendicularly polarized light.

51. The backlight module according to claim 7, wherein said organic compound containing heterocycles is sulfo-derivatives of acenaphthol[1,2-b]quinoxaline.

* * * * *